(12) United States Patent
Grabbe et al.

(10) Patent No.: US 8,528,740 B2
(45) Date of Patent: Sep. 10, 2013

(54) METHODS TO RECOVER AND PURIFY SILICON PARTICLES FROM SAW KERF

(75) Inventors: Alexis Grabbe, St. Charles, MO (US); Tracy M. Ragan, Warrenton, MO (US)

(73) Assignee: MEMC Singapore Pte. Ltd. (UEN200614794D), Singapore (SG)

(*) Notice: Subject to any disclaimer, the term of this patent is extended or adjusted under 35 U.S.C. 154(b) by 0 days.

(21) Appl. No.: 13/272,847

(22) Filed: Oct. 13, 2011

(65) Prior Publication Data

US 2012/0027660 A1    Feb. 2, 2012

Related U.S. Application Data

(62) Division of application No. 12/647,991, filed on Dec. 28, 2009, now Pat. No. 8,231,006.

(60) Provisional application No. 61/141,974, filed on Dec. 31, 2008.

(51) Int. Cl.
*B07C 5/02* (2006.01)

(52) U.S. Cl.
USPC .................. 209/3.1; 209/9; 209/10

(58) Field of Classification Search
USPC .................. 209/3, 9.1; 423/348, 349
See application file for complete search history.

(56) References Cited

U.S. PATENT DOCUMENTS

| | | |
|---|---|---|
| 3,483,969 A | 12/1969 | Rosensweig |
| 3,788,465 A | 1/1974 | Reimers et al. |
| 4,187,170 A | 2/1980 | Westcott et al. |
| 4,347,124 A | 8/1982 | Shimoiizaka et al. |
| 4,388,080 A | 6/1983 | Kapur et al. |
| 4,388,286 A | 6/1983 | Kapur et al. |
| 4,419,228 A | 12/1983 | Cook et al. |
| 4,809,854 A | 3/1989 | Tomaszek |
| 5,635,889 A | 6/1997 | Stelter |
| 5,799,643 A | 9/1998 | Miyata et al. |
| 5,957,298 A | 9/1999 | Buske et al. |
| 6,264,843 B1 | 7/2001 | Wiesner |
| 6,468,886 B2 | 10/2002 | Wang et al. |
| 6,615,817 B2 | 9/2003 | Horio |
| 6,780,665 B2 | 8/2004 | Billiet et al. |
| 6,902,065 B2 | 6/2005 | Kimura et al. |
| 7,008,572 B2 | 3/2006 | Kimura et al. |

(Continued)

FOREIGN PATENT DOCUMENTS

| | | |
|---|---|---|
| CN | 1780901 A | 5/2006 |
| CN | 101130237 A | 2/2008 |

(Continued)

OTHER PUBLICATIONS

Office Action dated Sep. 25, 2012 in Co-Owned U.S. Appl. No. 13/272,885.

(Continued)

*Primary Examiner* — Terrell H Matthews
(74) *Attorney, Agent, or Firm* — Armstrong Teasdale LLP

(57) ABSTRACT

The present disclosure generally relates to methods for recovering silicon from saw kerf, or an exhausted abrasive slurry, resulting from the cutting of a silicon ingot, such as a single crystal or polycrystalline silicon ingot. More particularly, the present disclosure relates to methods for isolating and purifying silicon from saw kerf or the exhausted slurry, such that the resulting silicon may be used as a raw material, such as a solar grade silicon raw material.

12 Claims, 18 Drawing Sheets

(56) References Cited

U.S. PATENT DOCUMENTS

| | | | |
|---|---|---|---|
| 7,223,344 B2 * | 5/2007 | Zavattari et al. | 210/634 |
| 7,531,155 B2 * | 5/2009 | Li et al. | 423/348 |
| 8,056,551 B2 * | 11/2011 | Dalitz et al. | 125/16.02 |
| 2004/0144722 A1 * | 7/2004 | Zavattari et al. | 210/634 |
| 2006/0075687 A1 | 4/2006 | Tsuruta et al. | |
| 2008/0105651 A1 | 5/2008 | Mabuchi et al. | |
| 2008/0223351 A1 | 9/2008 | Morikawa et al. | |
| 2009/0274596 A1 * | 11/2009 | Takahashi et al. | 422/267 |
| 2010/0068115 A1 * | 3/2010 | Kajimoto et al. | 423/349 |
| 2011/0280785 A1 * | 11/2011 | Fallavollita | 423/349 |

FOREIGN PATENT DOCUMENTS

| | | |
|---|---|---|
| EP | 1181982 B1 | 10/2004 |
| EP | 1369433 B1 | 6/2007 |
| JP | 6087607 A | 3/1994 |
| JP | 2000191312 A | 7/2000 |
| JP | 2001278612 A | 10/2001 |
| JP | 2008290897 A | 12/2008 |
| TW | 466137 B | 12/2001 |
| TW | 200619365 | 6/2009 |
| WO | 2005105314 A1 | 11/2005 |

OTHER PUBLICATIONS

Beaugnon et al., "Levitation of Organic Materials," Nature, 349(6309):470 (1991).

Catherall et al., "Magnetic Levitation: Floating Gold in Cryogenic Oxygen," Nature, 422:579 (2003).

Cisek et al., "Solar-Grade Silicon from Metallurgical-Grade Silicon Via Iodine Chemical Vapor Transport Purification," National Renewable Energy Laboratory Publication, NREL/CP-520-31443, May 2002.

Ikezoe et al., "Making Water Levitate," Nature, 393(6687):749-750 (1998).

Istratov et al., "Physics of Copper in Silicon," Journal of Electrochemical Society, 149(1):G21-G30 (2002).

Kimura et al., "Separation of Solid Polymers by Magneto-Archimedes Levitation," Chemistry Letters, 29(11):1294-1295 (2000).

Noguchi et al., "Chemical Treatment Effects of Silicon Surfaces in Aqueous KF Solution," Applied Surface Science, 246(1-3):139-148 (2005).

Yamada et al., "A Kinetic Study of Copper Ion Extraction by P50 at the Oil-Water Interface," Analytical Sciences, 14(1):225-229 (1998).

Invitation to Pay Additional Fees and Partial International Search Report for PCT/US2009/069616, dated May 19, 2010.

Co-Owned U.S. Appl. No. 12/647,991, filed Dec. 28, 2009.

Co-Owned U.S. Appl. No. 13/272,885, filed Oct. 13, 2011.

Notice of Allowance dated May 23, 2012 in Co-Owned U.S. Appl. No. 12/647,991.

Office Action dated Dec. 7, 2011 in Co-Owned Patent U.S. Appl. No. 12/647,991.

International Search Report and Written Opinion for analogous application No. PCT/US2009/069616 issued Nov. 3, 2010 (20 pages).

* cited by examiner

Figure 9

INJECT AEROSOL
HERE

ONLY SILICON
CAN FALL
THROUGH

METHODS TO RECOVER AND PURIFY SILICON PARTICLES FROM SAW KERF

CROSS-REFERENCE TO RELATED APPLICATIONS

This application is a Divisional of U.S. patent application Ser. No. 12/647,991, filed Dec. 28, 2009, which claims the benefit of U.S. Provisional Patent Application Ser. No. 61/141,974, filed Dec. 31, 2008, the entire contents of which are incorporated herein by reference.

FIELD OF THE DISCLOSURE

The present disclosure generally relates to methods for recovering silicon from saw kerf, or an exhausted abrasive slurry, resulting from the cutting of a silicon ingot, such as a single crystal or polycrystalline silicon ingot. More particularly, the present disclosure relates to methods for isolating and purifying silicon from saw kerf or the exhausted slurry, such that the resulting silicon may be used as a raw material, such as a solar grade silicon raw material.

BACKGROUND OF THE DISCLOSURE

Silicon wafers are conventionally prepared from a single crystal or a polycrystalline silicon ingot, which typically has a cylindrical shape. The ingot is sliced in a direction normal to its longitudinal axis to produce as many as several hundred thin, disk-shaped wafers. The slicing operation is typically accomplished by means of one or more reciprocating wire saws, the ingot being contacted with the reciprocating wire while a liquid slurry containing abrasive grains, such as silicon carbide, is supplied to a contact area between the ingot and the wire. Conventional wire saw slurries typically comprise a lubricant acting as a suspending and cooling fluid, such as, for example, a mineral oil or some water-soluble liquid (e.g., polyethylene glycol, or PEG).

As the ingot is sliced, the abrasive particles of the slurry are rubbed by the wire saw against the ingot surface, causing silicon particles from the ingot to be removed, as well as metal (e.g., iron) from the wire itself. A significant amount of silicon particles are lost during cutting. The silicon material that accumulates as an ingot is sliced is conventionally known as the "saw kerf." As the concentration of silicon, as well as other particulate (e.g., metal particulate), in the slurry increases, the efficiency of the slicing operation decreases. Eventually, the slurry becomes ineffective, or "exhausted," and then it is typically disposed of or discarded. Traditionally, the exhausted slurry has been disposed of by incineration or treated by a waste water treatment facility. However, burning the slurry generates carbon dioxide and sending the slurry to a waste water treatment facility typically results in the formation of a sludge that must be disposed of in a landfill. Accordingly, both approaches of disposal are unfavorable from an environmental point of view, as well as the costs associated therewith. As a result, some have proposed methods by which the abrasive slurry can be recycled and reused. (See, e.g., U.S. Pat. No. 7,223,344, the entire contents of which are incorporated herein by reference for all relevant and consistent purposes.)

However, in addition to the environmental and economic concerns associates with the saw kerf, or exhausted slurry, the loss of potentially useful silicon material should also be considered. Specifically, although wire saw technology has improved, each pass of the wire through the silicon ingot results in the lost of an amount of silicon equivalent to about a 250 to 280 micron thick slice of the ingot. As technology enables thinner and thinner wafers to be slice from the ingot, more and more passes of the wire through the ingot occurs, resulting in more and more loss of silicon to saw kerf. For example, with existing wire saw technologies, kerf loss can represent from about 25% to about 50% of the silicon ingot material.

While there have been some general suggestions of recovering the silicon material from the saw kerf or exhausted slurry for use in, for example, photovoltaic cells (see, e.g., U.S. Pat. No. 6,780,665, the entire contents of which is incorporated herein by reference for all relevant and consistent purposes), there are several drawbacks. For example, the previously known methods do not provide a means of addressing bulk and surface metal contamination that may be present in silicon obtained from the kerf. This can have a significant impact on the purity of the recovered silicon, and subsequently on the end uses that are available for the recovered silicon. Further, the methods of silicon recovery (e.g., froth flotation recovery) used to-date typically do not recover an adequate amount of silicon particles for re-use.

Accordingly, there remains a need for a method to recover and purify silicon particles created by the cutting of silicon ingots so that the recovered silicon can, for example, be melted and recycled for use in various applications, including solar grade silicon material. Optionally, such a method would additionally allow for the recovery of the silicon carbide used in the slurry process, so that it may also be re-used.

SUMMARY OF THE DISCLOSURE

Briefly, therefore, the present disclosure is directed to, in one embodiment, a method for separating and recovering silicon particles from silicon saw kerf resulting from slicing silicon wafers from a silicon ingot, the saw kerf comprising a lubricating fluid and a mixture of solid particulate comprising abrasive grains, silicon particles, metal particles and oxide particles. The method comprises: separating at least a portion of the lubricating fluid from the solid particulate mixture; washing the solid particulate mixture with an acidic solution in which (i) the silicon particles are substantially insoluble, and (ii) the metal particles and oxides particles are soluble, metal particles and oxide particles being dissolved from the solid particulate mixture; collecting the washed solid particulate mixture, the washed mixture comprising silicon particles and abrasive grains; and, separating the silicon particles from the abrasive grains in the washed solid particulate mixture. Advantageously, the separated silicon particles may have a carbon content of less than about 50 ppma and have a content of metal contaminants of less than about 150 ppma.

The present disclosure is further directed to such a method wherein washing the solid particulate mixture comprises contacting the solid particular mixture with an acidic solution capable of creating a flotation froth with the solid particulate mixture, the froth comprising silicon particles and abrasive grains.

The present disclosure is further directed, in another embodiment, to a method for separating and recovering silicon particles from silicon saw kerf resulting from slicing silicon wafers from a silicon ingot, the saw kerf comprising an organic lubricating fluid and a mixture of solid particulate comprising abrasive grains, silicon particles, metal particles and oxide particles. The method comprises: contacting the saw kerf with a chelating agent soluble in the organic lubricating fluid to form a complex with one or more metals present in the saw kerf; mixing the chelated saw kerf solution with an aqueous acid solution and allowing the mixture to separate into an aqueous phase and an organic phase, the aqueous phase comprising silicon particles and the organic phase comprising the complex formed between chelating agent and the metals; collecting the aqueous phase comprising the silicon particles; and, recovering at least a portion of the silicon particles from the aqueous phase. Advantageously, the recovered silicon particles may have a carbon content of less than about 50 ppma and have a content of metal contaminants of less than about 150 ppma.

The present disclosure is further directed to one or more of the preceding embodiments, wherein the silicon particles are recovered by subjecting the (i) collected, washed solid particulate mixture, or (ii) the froth formed from the washed solid particulate mixture, or (iii) the aqueous phase comprising the silicon particles, to a density-dependent separation technique, and in particular a density-dependent separation technique selected from sedimentation centrifugation, filtration centrifugation, and hydro-cyclone separation.

The present disclosure is further directed to one or more of the preceding embodiments, wherein the silicon particles are recovered by first drying the (i) collected, washed solid particulate mixture, or (ii) the froth formed from the washed solid particulate mixture, or (iii) the aqueous phase comprising the silicon particles, and then subjecting the dried froth to a non-uniform magnetic field (i.e., a magnetic field gradient) in order to separate the silicon particles from the abrasive particles, and more particularly silicon carbide abrasive particles.

The present disclosure is still further directed to one or more of the preceding embodiments, wherein the abrasive grains, and in particular silicon carbide, are additionally recovered for re-use.

The present disclosure is further directed to a method for preparing a solar grade silicon pellet from a silicon saw kerf as detailed above. The method comprises: (i) recovering silicon particles from the saw kerf by one of the preceding embodiments; (ii) melting the recovered silicon; and, (iii) forming a solar grade silicon pellet from the melted silicon.

The present disclosure is further directed to a method for slicing a silicon ingot. The method comprises contacting a surface of the silicon ingot with a reciprocating wire saw and a slurry comprising an organic lubricating fluid, an abrasive particulate, and a metal chelating agent soluble in the organic lubricating fluid.

BRIEF DESCRIPTION OF THE DRAWINGS

FIG. 9 is a graphical depiction of the magneto-Archimedes effect wherein the magnetic configuration of FIGS. 5 and 6 is rotated.

FIG. 14 further depicts the sedimentation velocity of 500 nm silicon and 100 nm silicon carbide particles versus sodium metatungstate density.

It is to be noted that corresponding reference characters indicate corresponding parts throughout the several views of the drawings.

Figure 1:
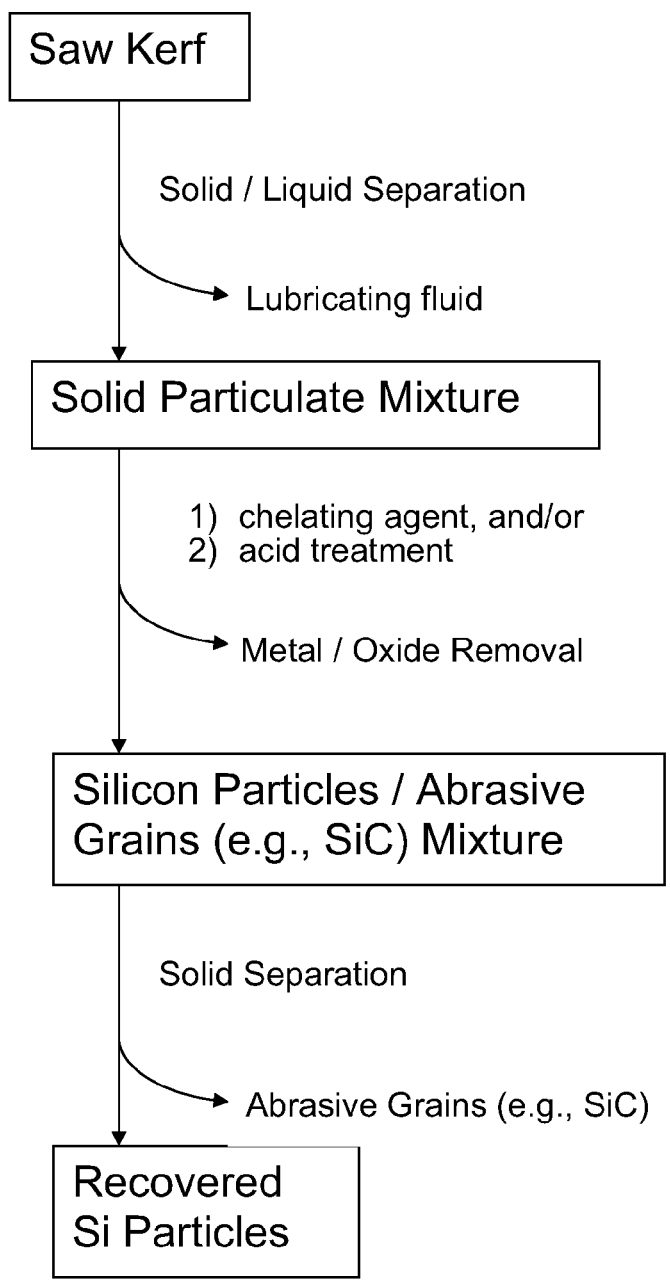
FIG. 1 is a workflow depicting a general overview of the process of the present disclosure, including separation of the lubricating agent from the solid particulate mixture in the saw kerf.
Figure 2:
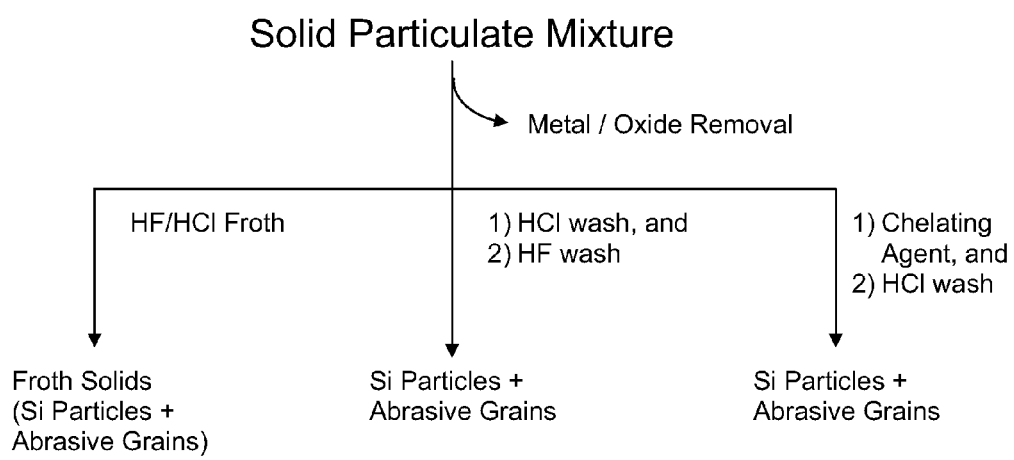
FIG. 2 is a workflow depicting a general overview of a portion of the process of the present disclosure, and in particular the options for removing metal and oxide particles from the solid particulate mixture.

It is to be further noted that the design or configuration of the components presented in these figures are not to scale, and/or are intended for purposes of illustration only. Accordingly, the design or configuration of the components may be other than herein described without departing from the intended scope of the present disclosure. These figures should therefore not be viewed in a limiting sense.

DETAILED DESCRIPTION OF THE DISCLOSURE

In accordance with the present disclosure, it has been discovered that silicon particles in a silicon ingot saw kerf (or an exhausted slurry resulting from the slicing of a silicon ingot) can be efficiently isolated and purified, thus rendering the isolated and purified particles suitable for reuse as a raw material in other silicon applications (e.g., solar grade silicon). As further detailed herein below, and as illustrated, for example, in the workflows of FIGS. 1-4, the isolation and purification of the silicon particles from the saw kerf may be achieved using a sequence of one or more generally known liquid/solid, liquid/liquid, and/or solid/solid separation techniques, in combination with the treatment of the saw kerf, or a portion thereof, with an aqueous acid solution. The resulting silicon particles may have, for example, a carbon content of less than about 50 ppma (parts per million atomic), about 40 ppma, about 30 ppma, about 25 ppma or less (e.g., about 20 ppma, about 15 ppma, or even about 10 ppma), and/or may have a total content of metal contaminants (e.g., copper, nickel, iron, etc.) of less than about 150 ppma, about 125 ppma, about 100 ppma or less (e.g., about 90 ppma, about 70 ppma, or even about 50 ppma), as further illustrated in the working Examples.

In this regard it is to be noted that, as used herein, the phrase "saw kerf" generally reference to the waste material that results from the slicing of sawing process utilized to cut a silicon ingot. This phrase may optionally be used herein interchangeable with the phrase "exhausted slurry" from a silicon ingot slicing or sawing process, which generally refers to a slurry that is essentially no longer suitable for purposes of slicing silicon wafers from a silicon ingot as a result of, for example, an unacceptably high content of silicon and/or metal particulate that hinders the slicing operation. Some believe that silicon particulate hinders a silicon ingot slicing operation at concentrations above about 1-5% by weight, of the solid matter in the slurry. It is also believed that metal particulate hinders the slicing operation at concentrations above about 0.5-2% by weight, of the solid matter in the slurry.

Additionally, "spent abrasive grains" generally refers to abrasive grains (e.g., silicon carbide, or SiC) that, as a result of being worn down by the slicing process, are of a diameter or size which is generally no longer suitable for purposes of slicing silicon wafers from a silicon ingot. Some believe that abrasive grains are spent if they have a particle size of less than about 1 micron (e.g., an approximate diameter of less than about 1 micron). "Unspent abrasive grains" generally refers to abrasive grains in the exhausted slurry which are still suitable for purposes of slicing silicon wafers from a silicon ingot, such grains typically have a particle size of greater than about 1 micron. Some believe that the spent abrasive grains hinder a silicon ingot slicing operation at concentrations above about 5-10%, by weight of the total abrasive grains (i.e., spent and unspent abrasive grains).

1. Analysis of Exemplary Saw Kerf/Exhausted Slurry

Gravimetric analysis was performed on representative samples of saw kerf waste material slurry obtained from representative wafer slicing processes of single crystal silicon ingots. These waste slurry samples were found to include polyethylene glycol (PEG), which was used as the lubricating fluid therein, silicon carbide, which was used as the abrasive grains therein, iron, copper, zinc, silicon, their respective oxides, and other various impurities (of lesser concentrations as compared to the other noted components). More specifically, by successive treatments of samples (both the raw "saw waste" material, as well as the "process waste" obtained from a commercially available slurry recovery system) by means of rinsing with water, an aqueous HCl solution, and aqueous HF solution, an aqueous HF/NO$_3$ solution, with intermediate drying and weighing steps, the overall composition of the representative saw kerf waste samples were found to be as reported in Table 1 and Table 2, below.

TABLE 1

Mass Fraction of Saw Kerf Components Including PEG.
(propagated weighing errors are one standard deviation)

| Component weight fraction | Processed Waste | Saw Waste |
|---|---|---|
| Polyethylene glycol | 0.438 +/− 0.001 | 0.320 +/− 0.001 |
| HCl removable (metals) | 0.010 +/− 0.001 | 0.006 +/− 0.001 |
| HF removable (oxides) | 0.021 +/− 0.001 | 0.006 +/− 0.001 |
| HF + HNO$_3$ removable (silicon) | 0.011 +/− 0.001 | 0.009 +/− 0.001 |
| Impervious material (SiC) | 0.519 +/− 0.002 | 0.660 +/− 0.003 |

TABLE 2

Mass Fraction of Saw Kerf Components Excluding PEG.
(propagated weighing errors are one standard deviation)

| Solids only weight fraction | Processed Waste | Saw Waste |
|---|---|---|
| HCl removable (metals) | 0.018 +/− 0.002 | 0.009 +/− 0.002 |
| HF removable (oxides) | 0.038 +/− 0.002 | 0.008 +/− 0.002 |
| HF + HNO$_3$ removable (silicon) | 0.020 +/− 0.002 | 0.013 +/− 0.013 |
| Impervious material (SiC) | 0.924 +/− 0.006 | 0.970 +/− 0.006 |

As the results of the Tables above indicate, recovery of the silicon particles present in the saw kerf or exhausted slurry may be achieved by proper selection of a solvent (or solvents) that dissolve unwanted contaminants (e.g., metal particles, oxide particles, etc.), or alternatively by proper selection of a chelating agent which traps the unwanted contaminants (e.g., metal particles), or a combination thereof, without dissolving the silicon particles, and then further selecting an appropriate means for separating the solid silicon particulate from the other remain undesirable solids (e.g., abrasive grains, such as silicon carbide particles). Accordingly, in one or more of such embodiments, the saw kerf or exhausted slurry is contacted with a solvent in which the silicon particles are substantially insoluble (e.g., a solvent in which less than about 5%, about 3%, about 1%, about 0.5%, or less, by weight of the silicon present is dissolved when contacted with the solvent). In an alternative embodiment, however, a combination of solvent and a chelating agent may be used, the chelating agent trapping metal contaminants for removal from the saw kerf or exhausted slurry (and more specifically from the silicon particles that are to be recovered).

2. Removal of Metal/Oxide Particles and Contaminants

Referring again to FIGS. 1-4, it accordingly to be noted that the present disclosure is directed to methods for separating and recovering silicon particles from silicon saw kerf resulting from slicing silicon wafers from a silicon ingot. As previously noted above, the saw kerf typically comprises a lubricating fluid and a mixture of solid particulate, the solid particulate including or comprising abrasive grains (e.g., silicon carbide), silicon particles, metal particles and oxide particles. Generally, in a first embodiment the method comprises optionally separating at least a portion (e.g., about 25%, about 50%, about 75% or more, by weight) of the lubricating fluid from the solid particulate mixture, and then washing the resulting solid particulate mixture (or slurry, depending upon how much, if any, of the lubricating fluid is removed) with one or more acidic solutions in which the silicon particles are substantially insoluble, and the metal particles, the oxides particles, or both, are soluble. In this way, the metal particles and/or the oxide particles may be dissolved and separated from what remains of the solid particulate mixture (and in particular the silicon particles therein). The washed solid particulate mixture, which comprises silicon particles and abrasive grains (e.g., silicon carbide), may then be subject to a solid separation process of some kind in order to separate the silicon particles from the abrasive grains.

In an alternative embodiment, such as wherein the saw kerf comprises an organic lubricating fluid, metal contaminants may be removed therefrom by means of a chelating agent that is soluble in the organic lubricating fluid. Specifically, the saw kerf is contacted with a chelating agent soluble in the organic lubricating fluid to form a complex with one or more metals present in the saw kerf. The chelated saw kerf, which may be in the form of a slurry or suspension for example, may then be contacted, and optionally agitated with, an aqueous acid solution. The resulting aqueous/organic mixture is then allowed to separate into an aqueous phase and an organic phase, the aqueous phase comprising silicon particles and the organic phase comprising the complex formed between chelating agent and the metals. The two liquid phases may be separated using means generally known in the art. After collecting the solids from the aqueous phase (by filtration, evaporation/drying, etc.), the resulting solids may be separated to collect or recover at least a portion of the silicon particles from the other solids present (e.g., the abrasive grains).

In this regard it is to be noted that the ratio of organic solution to aqueous solution, the number of liquid/liquid extractions, etc. may be determined experimentally, in order to optimize the amount of silicon particles that are recovered.

It is also to be noted that various options for removing the metal and/or oxide particles from the saw kerf are further detailed herein below.

A. Optional Removal of Lubricating Fluid

As noted above, substantially all, or a portion of, the lubricating fluid present in the saw kerf, or exhausted slurry, may optionally be removed prior to further treatment of the solid particulate mixture. If desired, essentially any known method for separating solids of a small diameter (e.g., typically between about 0.5 microns and about 25 microns, the silicon particles for example typically falling within a particle size range of between about 0.5 microns and about 10 microns, or about 0.75 microns about 7.5 microns, while the abrasive grains, such as silicon carbide, typically fall within a particle size range of between about 2.5 and about 25 microns, or about 5 microns and about 20 microns) may be used. In one preferred embodiment, the method employed is one that yields a lubricating fluid that is substantially free of solids (e.g., preferably less than about 1 g of solids per liter of lubricating fluid). Filtration of the saw kerf, or exhausted slurry, using techniques generally known in the art, such as press filtration, is an example of a method that may be used to separate the solid matter from the lubricating fluid. Press filtration generally involves separating the saw kerf or exhausted slurry into a liquid fraction and a solids fraction (e.g., a solid particulate mixture) by passing it through at least one screen, such as a polypropylene screen, having a pore or mesh size which is sufficient to remove substantially all of the solids from the fluid at an elevated pressure. (See, e.g., filtration details provided in U.S. 2004/0144722, which is incorporated herein by reference.)

Filtration yields a "cake" of solids (i.e., a solid particulate mixture) that comprises the silicon particles, metal particles, and abrasive grains (i.e., spent abrasive grains, unspent abrasive grains), and likely at least some trace amount of the lubricating fluid (the concentration of lubricating fluid in the cake typically being, for example, less than about 25%, 20%, 10%, or even 5%, by weight of the cake). The solid particulate mixture resulting from the filtration or separation may then be further processed, in order to isolate silicon particulate from the other solid particles present therein. Optionally, however, prior to further separating the solids, and while still in the filtering apparatus, the solids may be washed with a solvent (e.g., water or methanol) to reduce the concentration of lubricating fluid present therein.

B. HCl/HF Solutions, and/or Chelating Agents

In one embodiment, the saw kerf may be contacted (e.g., rinsed or washed) with individual aqueous solutions of hydrochloric acid (HCl) and hydrofluoric acid (HF), in order to dissolve and remove metal particles or contaminants (HCl solution), and oxide particles or contaminants (HF solution) present therein, and/or to remove metal contaminants present on or in (e.g., present in the bulk of) the silicon particles.

With respect to the removal of metal or oxide particles, it is to be noted that the concentration of the acid solutions, and/or the number of times the saw kerf is contacted with each one, and/or the amount of acid solution needed for a given amount of saw kerf, may be optimized for a given saw kerf in order to maximize contaminant removal. Typically, however, the saw kerf may be treated with between about 1 and about 5, or about 2 and about 4, stoichiometric equivalents of the aqueous HF solution, the HCl solution, or both, relative to the concentration (or number of equivalents) of silicon present therein. Additionally, or alternatively, a typically suitable aqueous HCl solution has a HCl concentration of about 0.5 to about 0.25 normal (N), or about 0.75 to about 0.2 N, or about 0.1 normal (N), while a typically suitable aqueous HF solution has a HF concentration of about 40% to about 60% (by weight), or about 45% to about 55%, or even about 49%.

In this regard it is to be noted that, in addition to dissolving metal and oxide contaminants or particles, treatment of the saw kerf with the acidic solutions may also act to break bonds present between silicon and, for example, carbide, that may be present, thus enabling separation of the silicon from the carbide.

In this regard it is to be further noted that, when certain fast diffusing metals (i.e., metals, such as copper or nickel, capable of diffusing or moving throughout the silicon in a relative short period of time, on the order of a few hours—e.g., less than about 8 hours, about 6 hours, about 4 hours, or even about 2 hours, at for example room temperature) are present, the saw kerf, and more specifically the silicon particles present therein, may be "aged" or allowed to stand at an appropriate temperature (e.g., room temperature) for a period of time, either before or during the acid treatment (i.e., washing or rinsing), to allow time for the diffusing metals to reach the surface of the silicon particle and be trapped and/or removed by the acid solution.

In this regard it is to be still further noted that in saw kerf containing polyethylene glycol (PEG), the metals may be removed or leached from the silicon particles by repeated washing with water and the aqueous acid solution. In the presence of HF and essentially no surface oxide, copper will plate out onto the silicon particle surface. In the presence of HCl, however, copper deposition on the surface of the silicon particles can be prevented. Therefore, in aqueous systems (i.e., saw kerfs or slurries), at least one cycle or step of the washing or leaching step will preferably not use HF, but rather will preferably use HCl.

In this regard it is to be still further noted that, in an alternative embodiment, a chelating agent may be used alone or in combination (e.g., sequentially) with one or more of the aqueous acidic solutions. A chelating agent may be use to trap or sequester the metal as it diffuses to the surface of the silicon particles. Essentially any known chelating agent that is effective for sequestering the metal or metals of interest (e.g., iron, copper, zinc, nickel, etc.), and that is compatible with other components to which it comes into contact, may be used.

Figure 3:
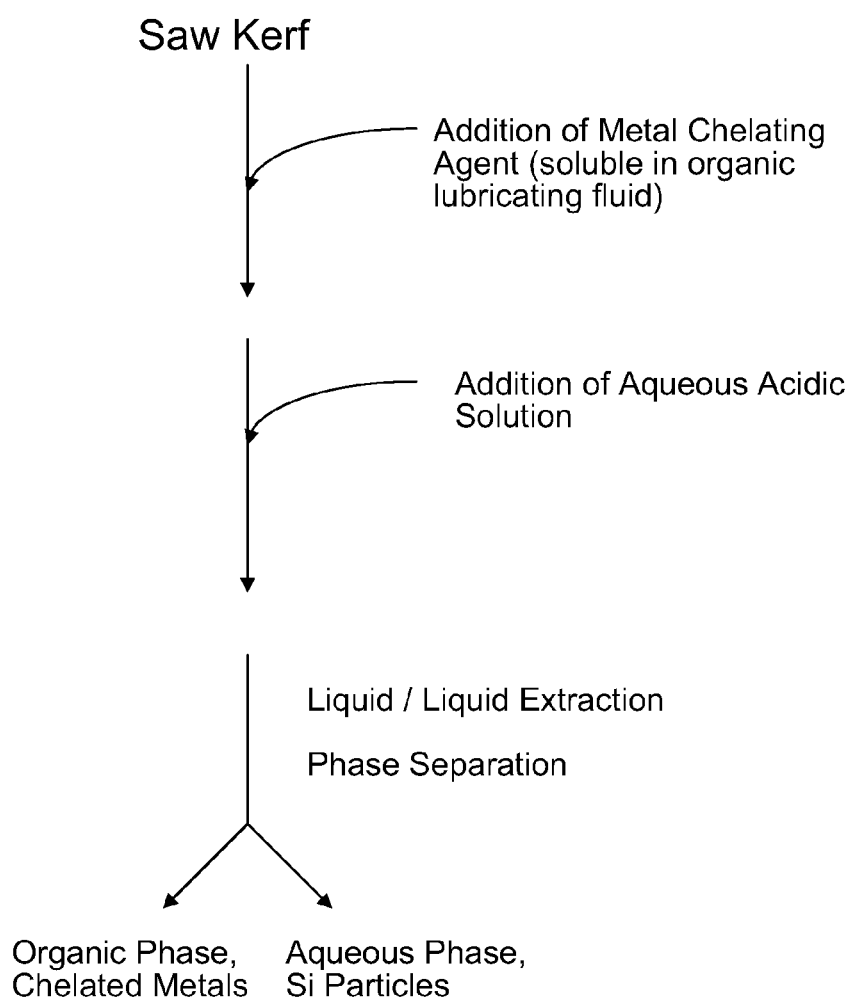
FIG. 3 is a workflow depicting a general overview of a portion of the process of the present disclosure, and in particular an optional method for removing metal and oxide particles from the saw kerf and solid particulate mixture.
Figure 4:
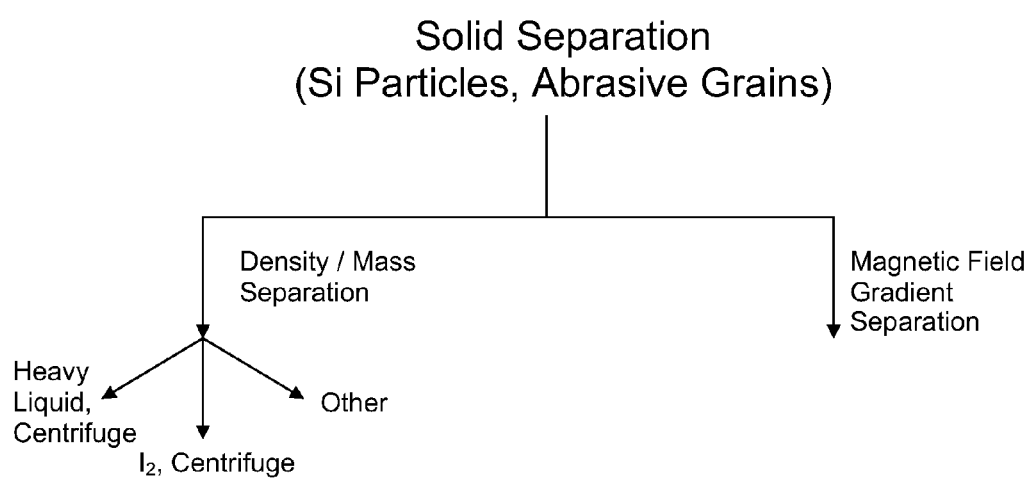
FIG. 4 is a workflow depicting a general overview of a portion of the process of the present disclosure, and in particular the options for separating silicon particles from the abrasive grains (e.g., silicon carbide).

Referring now to FIG. 3, in one particular embodiment, wherein the saw kerf or exhausted slurry comprises an organic lubricating fluid, such mineral oil, a chelating agent that is soluble in the organic lubricating agent is added thereto (the saw kerf optionally being allowed to age for an appropriate period of time, either before or after having added the chelating agent thereto, to allow time for metals, such as copper and/or nickel, to diffuse from the bulk of the silicon particles present therein). A suitable chelating agent may be selected from among those generally known in the art, including for example known aldoxime chelating agents (e.g., 5-nonyl-2-hydroxybenzaldoxime, or "P50"), which are known to be effective to sequester, for example, copper. The resulting slurry may then be contacted and agitated (e.g., shaken) with an aqueous, acidic solution (e.g., a solution have a pH between about 1 and less than about 7, or between about 2 and about 3, such as a dilute HCl solution). The silicon particles, which are hydrophilic, will transfer to the aqueous phase of the resulting mixture, leaving the bulk of the chelate-metal complex in the organic phase. After allowing sufficient time for the two phases to separate, the aqueous phase may be collected or separated using conventional methods generally known in the art.

Regardless of the means by which the saw kerf is initially treated for purpose removing metal particles and/or oxide particles therefrom (including from the bulk of the silicon particles themselves), the resulting portion thereof that includes the silicon particles (e.g., the solid particle mixture that remains after treatment with the aqueous acidic solutions, or the aqueous phase resulting from the liquid extraction used when the lubrication fluid is organic), may be further treated as necessary (e.g., filtered to remove excess water, or dried, or used directly), in order to suitably prepare the solids for a subsequent solid separation to isolate and recover the desired silicon particles (the solid separation being further detailed herein below), and optionally recover the abrasive grains as well.

C. Froth Flotation

In another embodiment, the saw kerf may be contacted (e.g., rinsed or washed) with a mixed aqueous solution of hydrochloric acid (HCl) and hydrofluoric acid (HF), in order to dissolve and remove metal particles or contaminants (HCl solution), and oxide particles or contaminants (HF solution) present therein, and/or to remove metal contaminants present on or in (e.g., present in the bulk of) the silicon particles, and further to effectively separate the silicon particles from the contaminants dissolved in the solution. Specifically, it is to be noted that, in this solution, silicon is hydrogen terminated, and therefore is hydrophobic. It is therefore attracted to gas bubbles that form on its surface, while in the presence of HF. A froth is generated as a result of the volatile fluorides that are formed, and floating at or near the top of this froth is the visible gray sheen of silicon particles.

The concentration of the respective acids in solution, and/or the ratios of the two acids in solution to each other and/or the concentration of silicon present in the saw kerf, may be optimized experimentally using means generally known in the art, in order to maximize silicon separation from the saw kerf, and/or to maximize dissolution (and thus removal) of metal and/or oxide contaminants present therein. Additionally, the concentrations and/or ratios of the two acids may be altered to ensure an appropriate or sufficient amount of froth is formed (e.g., a sufficient amount to effectively suspend or float the silicon present therein). Typically, however, a ratio of about 75 to about 125 ml, or about 90 to about 110 ml, and in particular about 100 ml of a dilute HCl solution (0.5 to about 0.25 normal (N), or about 0.75 to about 0.2 N, and in particular about 0.1 N), is mixed with between about 5 and about 20 ml, or about 8 and about 16 ml, of an HF solution (the HF concentration therein being between about 40% to about 60% (by weight), or about 45% to about 55%, and in particular about 49%). This solution is then typically applied to or mixed with about 20 to about 50 grams, or about 25 to about 40 grams, and in particular about 30 grams, of solids (e.g., saw kerf material), resulting in a froth that is about 5 to about 8 time the volume of the initial liquid+solid mixture.

As disclosed in the working Examples below, a exemplary hydrochloric acid and water mixture or solution may have a ratio of about 1:9 36% $HCl:H_2O$, while the frothing solution may comprise a mixture of $H_2O$, HF (49% solution) and HCl (a 36% solution) in a ratio of about 10:3.125:1 (e.g., about 250 ml:80 ml:25 ml).

Once formed, the froth may be separated from the remaining liquid or solution, using means generally known in the art (e.g., filtration or skimming). Once collected, the froth may be dried for later solid separation, or directly subjected to an appropriate solid separation technique (e.g., density solid separation), as further detailed elsewhere herein.

3. Solid Separation

After the saw kerf have been treated to remove metal and/or oxide particles and contaminants, the resulting solid particulate mixture, which comprises silicon particles and abrasive grains (e.g., silicon carbide particles), may be separated using one or more means generally known in the art, including for example means capable of separating particles based on mass (e.g., weight or density) or size. Exemplary devices suitable for this type of separation include a hydro-cyclone separator or a sedimentation centrifuge, both devices being commercially available. Alternatively, and as further detailed herein below, provided there is an adequate difference in the diamagnetic properties of the solids that are to be separated (such as, for example, the differences between silicon and silicon carbide particles), a magnetic field gradient may be applied to the particles to separate them.

In this regard it is to be noted while the solids may be separated after treatment to remove metal and/or oxide particles or contaminants, in an alternative approach the solid particles may first be subjected to some form of separation technique (as noted above), provided the contaminants do not prevent an acceptable amount of the silicon particles from being separated from the abrasive grains. For example, in some instances the silicon particles may be bound in some way to the abrasive grit, and in particular to silicon carbide present. If these bonds can be broken, centrifugation may be an acceptable method for separating the various components of the saw kerf, because the silicon particles, the abrasive grit (e.g., silicon carbide), the metal and the oxide particles have sufficiently different weights or densities to allow for separation (metals and metal oxides typically having substantially higher densities than silicon and silicon carbide). The resulting silicon particles may then be subjected (or optionally subjected) to one or more of the techniques previously detailed above, in order to remove the metal and/or oxide particles or contaminants still present therein.

A. Mass Separation

Typically, the materials that are to be separated by, for example, centrifugation in the solid particulate mixture are silicon, which has an average density of about 2.33 g/cm$^3$, and silicon carbide, which has an average density of about 3.22 g/cm$^3$. Additionally, silicon dioxide has an average density of about 2.26 g/cm$^3$, but this can generally be removed by an acid wash or treatment of some kind as previously detailed herein, silicon dioxide for example being dissolved in a hydrofluoric acid solution.

Centrifugal separation of the solids may optionally being aided by the addition or use of a "heavy liquid," the appropriate liquid being selected to have a density sufficiently close to the materials being separated to aid in the separation. For example, when separating silicon and silicon carbide particles in this way, the density of the heavy liquid or fluid used in the separation will typically be between about 2 g/cm$^3$ and about 3.5 g/cm$^3$, and preferably will be between about 2.3 g/cm$^3$ and about 3.2 g/cm$^3$.

In this regard it is to be noted that there are several potentially suitable fluids that can be used in the heavy liquid centrifugal separation, the term "heavy liquid" being generally known in the art. Examples of suitable heavy liquids, and their respective densities, include: iodomethane ($CH_3I$), 2.2789 g/cm$^3$ at 20° C.; diiodomethane ($CH_2I_2$), 3.325 g/cm$^3$ at 20° C.; bromomethane ($CHBr_3$), 2.889 g/cm$^3$ at 15° C.; tetrabromomethane ($CBr_4$), 2.961 g/cm$^3$ at 100° C. and 3.420 g/cm$^3$ at 20° C.; hydrogen iodide (HI), 2.850 g/cm$^3$ at −47° C. and 2.797 g/cm$^3$ at −35.36° C.; bromine ($Br_2$), 3.1028 g/cm$^3$ at 20° C.; potassium fluoride mixture ($KF.2H_2O$), 2.420 g/cm$^3$ at 20° C.; and, aqueous heteropolytungstates, which typically have densities from about 1 to 3 g/cm$^3$ at 20° C.

The suitable heavy liquids have differing properties and costs associated with them. For example, iodomethane and diiodomethane are good for microscale tests when mixed with each other, but can be toxic and mutagenous. Bromomethane may be ideal for microscale testing, but can also be toxic and mutagenous. Hydrogen Iodide can be toxic as well, but does provide an ideal density separation for silicon and silicon carbide. Bromine can be toxic and difficult to handle due to its high vapor pressure. Further, bromine has been known to cause health effects associated with mental capacity. Accordingly, selection of a suitable heavy liquid will keep these issues in mind and will be accompanied by appropriate safety measures.

The potassium fluoride mixture ($KF.2H_2O$) has a number of advantages. For example, it has a relatively low cost, the centrifugal separation can be done in the liquid state, and the silicon layer can be scraped off after freezing of the container (and contents thereof). The mixture can also potentially etch silicon oxide on silicon, which can be advantageous during separation operations to break up chemically bonded agglomerates of silicon and silicon carbide, when bonded by thin layers of native silicon oxide. (See, e.g., H. Noguchi and S. Adachi, *Chemical treatment effects of silicon surfaces in aqueous KF solution*, Appl. Surf. Sci., Vol. 246, Issues 1-3, pages 139-48 (Jun. 15, 2005)).

Of the suitable heavy liquids, hydrogen iodide, bromine, bromomethane, the potassium fluoride mixture and the aqueous polytungstates are typically the most practical candidates for use. Suitable aqueous polytungstates include polyoxytungsten alkali salts that are capable of being partly substituted with any of the group consisting of potassium, arsenic, silicon, germanium, titanium, cobalt, iron, aluminum, chromium, gallium, tellurium, boron, iodine, nickel, molybdenum, beryllium, platinum, and the like. Suitably, sodium polytungstate (SPT) and lithium polytungstate (LPT) are used as the heavy liquids.

In an alternative embodiment to the use of a heavy liquid, or in addition to the use of a heavy liquid, the silicon may optionally be converted to a silane, and more specifically $SiI_4$, by means generally known in the art. While the silanes could be distilled and re-deposited or collected in the form of clean [poly]silicon, it may be preferable, due for example to the cost and/or complexity of such a process, to use the silane (e.g., $SiI_4$) form in the centrifugal separation process, particularly given that cryogenic hydrogen iodide, which may be used or formed therein, has a density within the range bounded by the silane particles themselves and the abrasive grains (e.g., silicon carbide particles).

It is to be noted that conversion to $SI_4$ is a potentially attractive option, particularly due to the potential for carrying out the conversion in a cost-effective manner. Iodine may be a naturally-occurring element of a silicon/silicon carbide separation process, and an iodide-based reactor process is known in the art to be readily available (See, e.g., Cisek, et al., *Solar Grade Silicon from Metallurgical Grade Silicon Via Iodine Chemical Vapor Transport Purification*, National Renewable Energy Laboratory Publication, NREL/CP-520-31443 (May 2002)).

It is to be noted that the process conditions used for solid separation (e.g., type of equipment used, number of cycles or revolutions through the device, or duration of the separation process), and/or the type and/or quantity of the separation aid (e.g., heavy liquid), used may be determined experimentally using techniques generally known in the art (and/or as further illustrated in the working Examples provided below). Additionally, or alternatively, it is to be noted that the resulting contents of the centrifuge container may optionally be frozen, in order to aid with recovery of the silicon particles.

B. Separation by Magnetic Field Gradient

As previously noted, silicon and, for example, silicon carbide, have different diamagnetic properties that can be used to separate them by a strong magnetic field gradient, which may be configured or designed using techniques and methods generally known in the art. Conventionally, there are three ways to make a magnetic separation. The first method involves water, the second method involves air, and the third method involves oxygen (which is a paramagnetic material). During the oxygen separation method, the magnetic forces on diamagnetic materials can be enhanced. (See, e.g., patents referring to paramagnetic fluids aiding in levitation of diamagnetic materials in magnetic fields, EP1181982, U.S. Pat. Nos. 7,008,572 and 6,902,065). Applying these known magnetic separation techniques, in combination with the use of permanent magnets, may present a cost-effective manner in which to magnetically separate the particles of interest in the present disclosure. The permanent magnet may be, for example, a neodymium magnet of the NdFeB type, and in particular the permanent magnet may be $Nd_2Fe_{14}B$.

As is generally recognized in the art, diamagnetic materials are repelled from magnetic fields by a force proportional to HgradH. Accordingly, and referring now to FIG. 5, a magnet arrangement used for maximum HgradH at the center is illustrated, which is suitable for use in accordance with the present disclosure for separation of silicon particles from other particles present in the mixed solid particulate sample (e.g., silicon carbide particles). This arrangement produces a non-uniform magnetic field of about 3 Tesla between a first and a second pole. The magnetic field lines in FIG. 5 display the cross section of a toroid around an air core. With the design of FIG. 5, it is possible to run a capillary tube down the center with particles flowing inside. A combination of gravitational forces and magnetic forces will then force particles to either side of the capillary.

Figure 6:
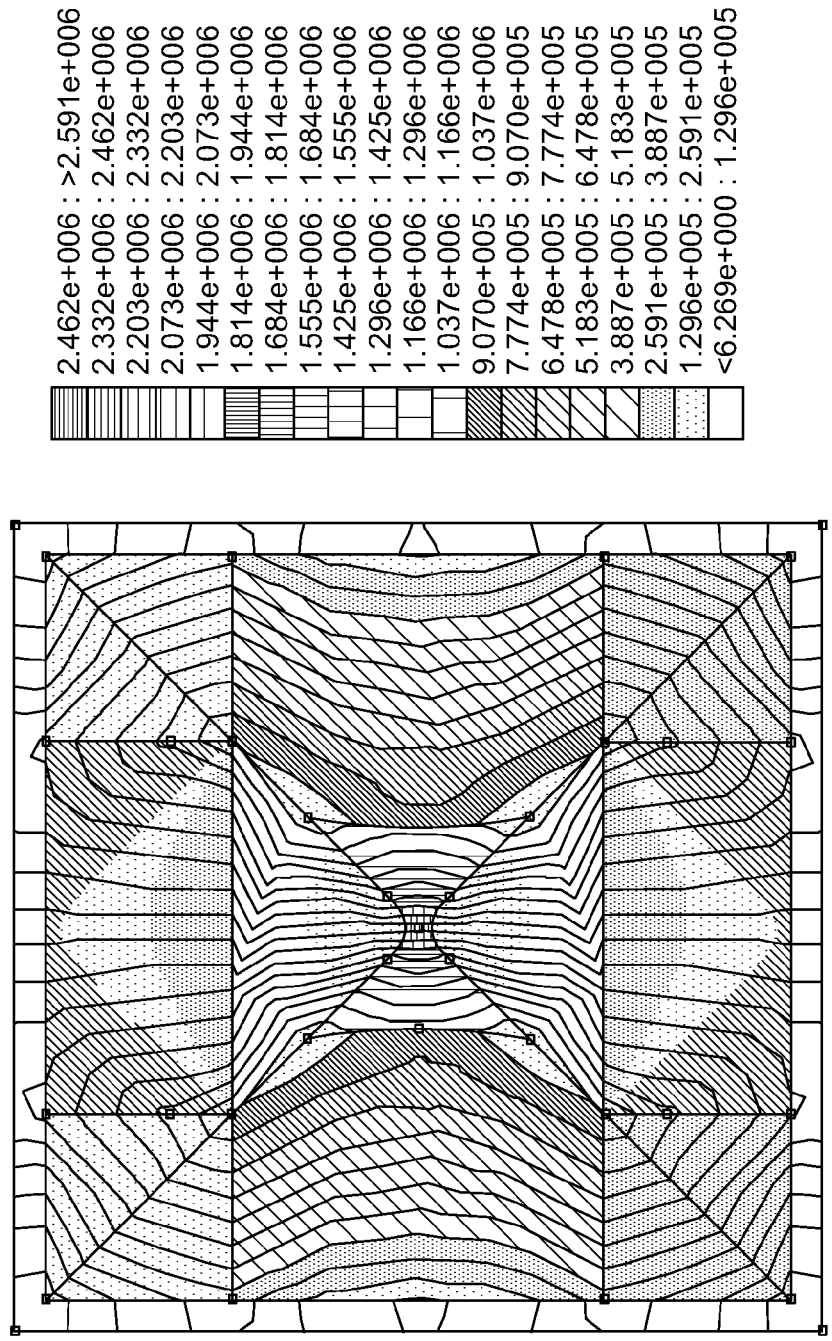
FIG. 6 depicts a magnitude of |H| relative to the iron poles and the respective density plots of |H| and $A/m^2$.

Referring now to FIG. 6, it is possible to calculate HgradH in the core of the magnetic field from left to right, which can then be used to calculate the forces on the particles within the field. The present disclosure found that in small areas, it is possible to obtain an HgradH from about $5 \cdot 10^{15}$ $A^2/m^3$ to about $6 \cdot 10^{15}$ $A^2/m^3$. The terminal velocity of a sphere in a fluid is calculated by:

$$v(r) = \frac{-2r^2}{9\eta_{fluid}}(g(\rho_{Solid} - \rho_{fluid}) + \mu_0 \rho_{Solid}(\chi_{Solid(mass)} - \chi_{fluid(mass)}))H\left(\frac{dH}{dz}\right)$$ (Equation 1)

where:

$\chi_{water(mass)} = -7.194 \cdot 10^{-7}$ $cm^3/g$ at 293K;
$\chi_{Si(mass)} = -1.112 \cdot 10^{-7}$ $cm^3/g$;
g is acceleration of gravity in the z-direction;
$\mu_o = 4\pi \cdot 10^{-7}$ $newton/ampere^2$;
v(r) is the terminal velocity of the particle or radius r in the z-direction in water of viscosity $\eta$;
$\rho$ is the density of the material denoted by the subscript of $\rho$ (thus, $\rho_{fluid}$ is the density of the separating fluid, e.g. in $kg/m^3$);
z is the direction of force exerted by gravity (i.e., it is the coordinate of "up" and "down"); and,
H is the magnetic field in units of Amperes/meter (A/m).

Figure 7:
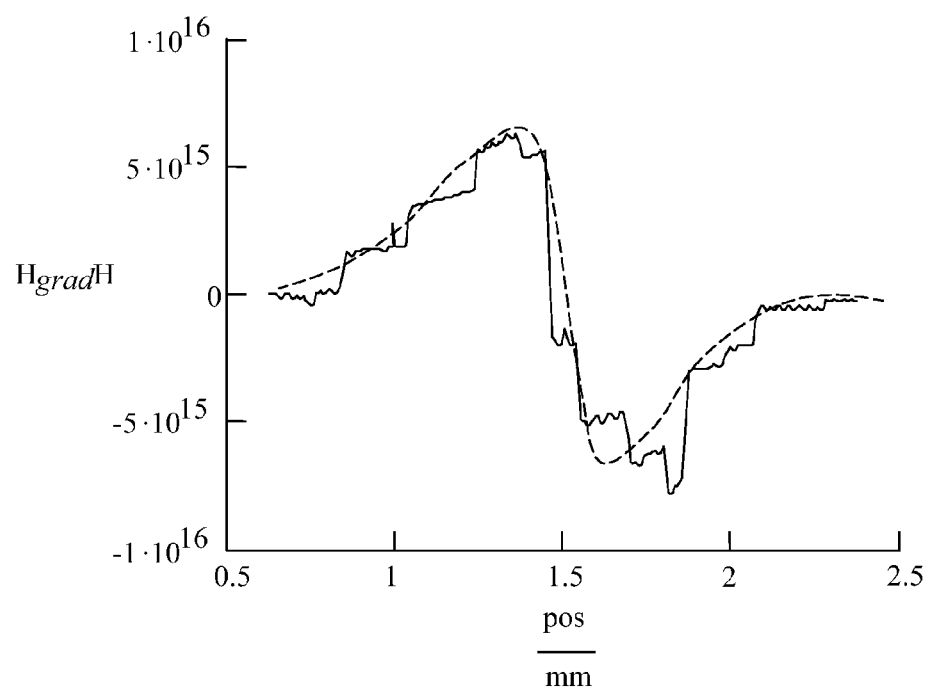
FIG. 7 depicts HgradH across the center of the magnetic separator. The solid line or curve represents the numeric calculation and the broken or dashed line or curve represents the numeric expectation.
Figure 8:
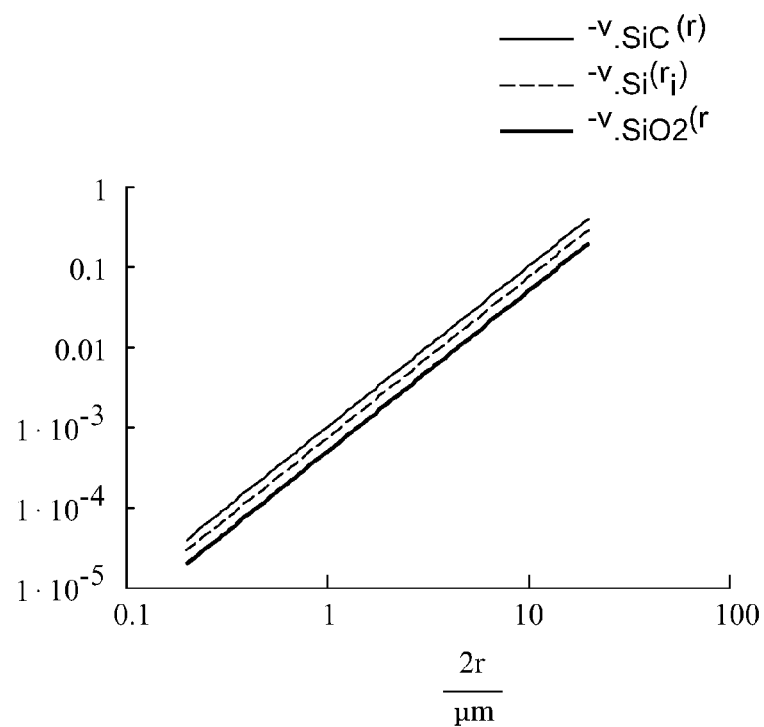
FIG. 8 depicts the terminal velocities by particle radius of silicon carbide, silicon, and silicon dioxide, where HgradH=$5 \times 10^{15}$ $A^2/m^3$ and same sign as g. The units of measurement are mm/minute for particles in water.

Referring now to FIGS. 7 and 8, by using the data displayed therein, it is possible to calculate for expected particle size ranges the terminal velocity of particles in water. Due to the combination of forces of magnetism, liquid viscous drag, gravity, and broad size distribution, separation by this magnetophoresis can be difficult in water. If, however, the particles are dried and suspended separated in air (as opposed to bonded to each other), and HgradH is increased to $2 \cdot 10^{16}$ $A^2/m^3$, then it is possible to produce separating motion based on the particular chemical identity of the particle. Through the use of liquid oxygen or liquid air, the permanent magnets can support the particles.

Figure 5:
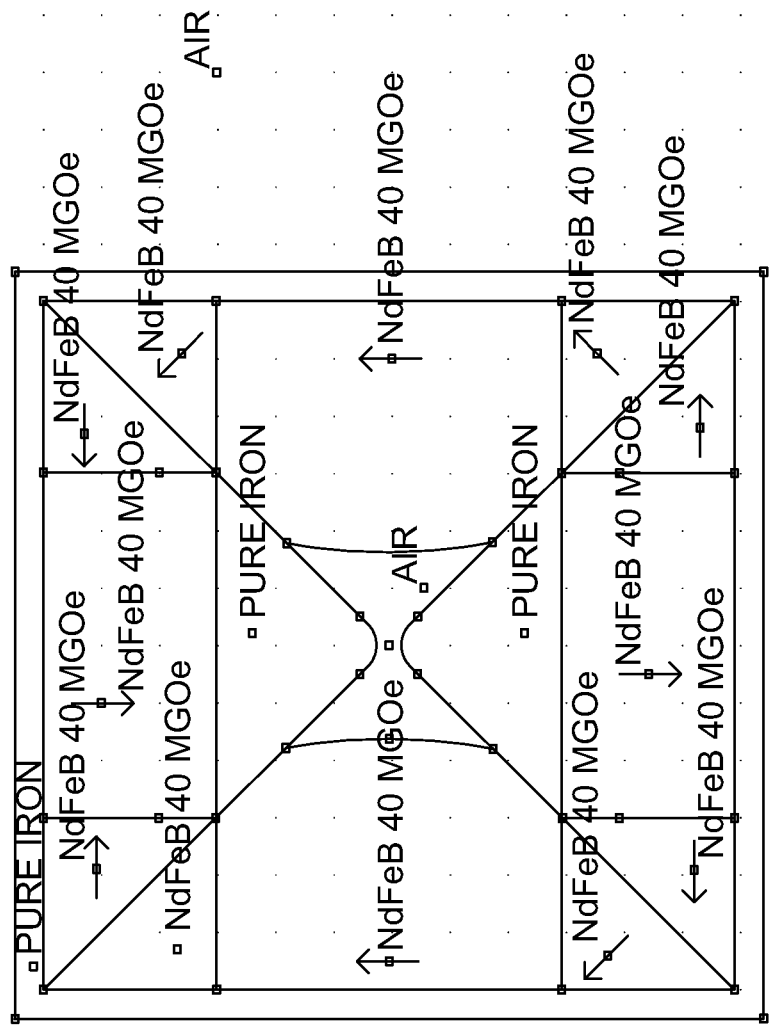
FIG. 5 depicts an arrangement of 12 40Moe magnets with an iron wrapper and iron poles in the center. The magnetic field lines are made to follow the cross-section of a toroid around the air core. The arrangement is 12 $mm^2$. The arrows in each magnet indicate magnetic north.
Figure 9:
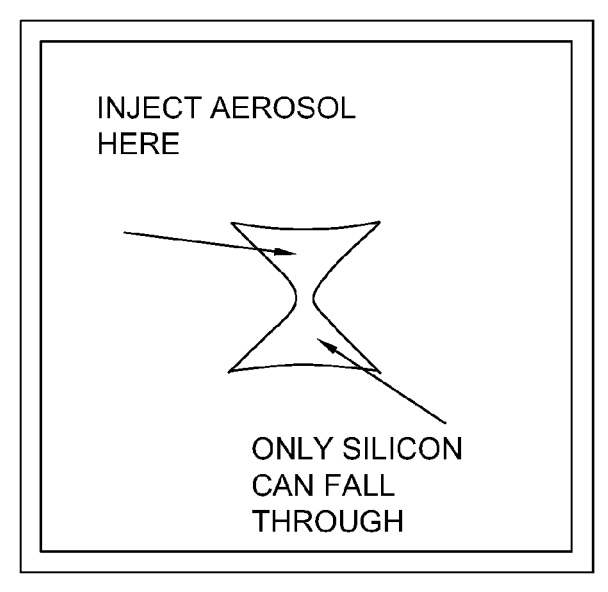
Figure 10:
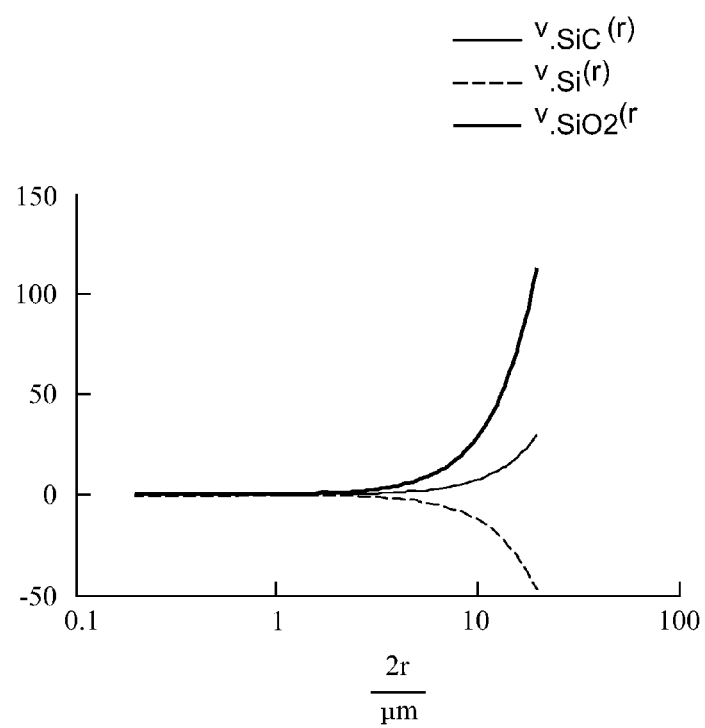
FIG. 10 depicts the terminal velocities by particle radius of silicon carbide, silicon and silicon dioxide in a field gradient where HgradH=$2 \times 10^{16}$ $A^2/m^3$ and same sign as g. The units of measurement are mm/minute for particles in the air.

Referring again to FIG. 6, and now to FIG. 9, the central region of FIG. 9 illustrating the center of FIG. 6 in schematic form, it is to be noted that by utilizing the magneto-Archimedes effect, the materials can be placed into the configurations of FIGS. 5 and 6 and rotated so that there is an upper and lower chamber or regions, as illustrated in FIG. 9. By pumping an aerosol of dry particles in liquid air into the upper chamber, only the silicon particles would fall through to the lower chamber under the force of gravity. Meanwhile, silicon carbide and silicon dioxide would remain magnetically suspended in the upper chamber. This configuration is also known as a magnetic filter. As shown in FIG. 10, wherein the terminal velocities are mm/min, essentially only silicon can be forced through the gap under gravity, whereas silicon carbide and silicon dioxide are suspended in the upper chamber.

It is to be noted that it may be possible to apply extra force on the particles by using a paramagnetic material (e.g., oxygen), where $\chi_{fluid(mass)}$ has a large and opposite sign to $\chi_{Solid(mass)}$ in Equation 1.

Figure 11:
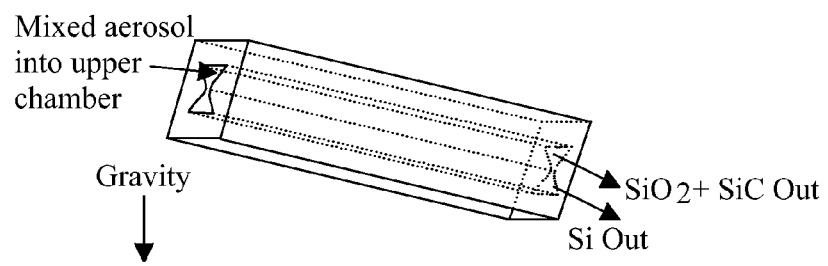
FIG. 11 depicts a schematic illustration of an inclined magnetic separator.

FIG. 11 further displays a practical implementation of the disclosed method. FIG. 11 is a magnetic arrangement of FIG. 6 extended as an inclined tube structure several meters long. The aerosol is injected at one end and at the other end the lower channel feeds a silicon bin and the upper channel feeds a kerf waste bin. That is, the silicon carbide and silicon dioxide are fed into a bin that collects particles from the upper chamber, whereas the silicon particles are fed into a separate bin that collects particles from the lower chamber, as depicted in FIG. 11. In the implementation of FIG. 11, liquid air may be needed in some instances, such as for 40Moe permanent magnets. Liquid air has a viscosity of 0.173 cP at $-192.3°$ C., a density of 0.87 $g/cm^3$, and a paramagnetic susceptibility of approximately $146 \cdot 10^{-6}$ $cm^3/g$. In liquid air, the value of HgradH that may be needed to form a magnetic filter can be greatly reduced. The exact field strength x gradient can be a narrow range for a liquid air mixture, and determined experimentally.

Figure 12:
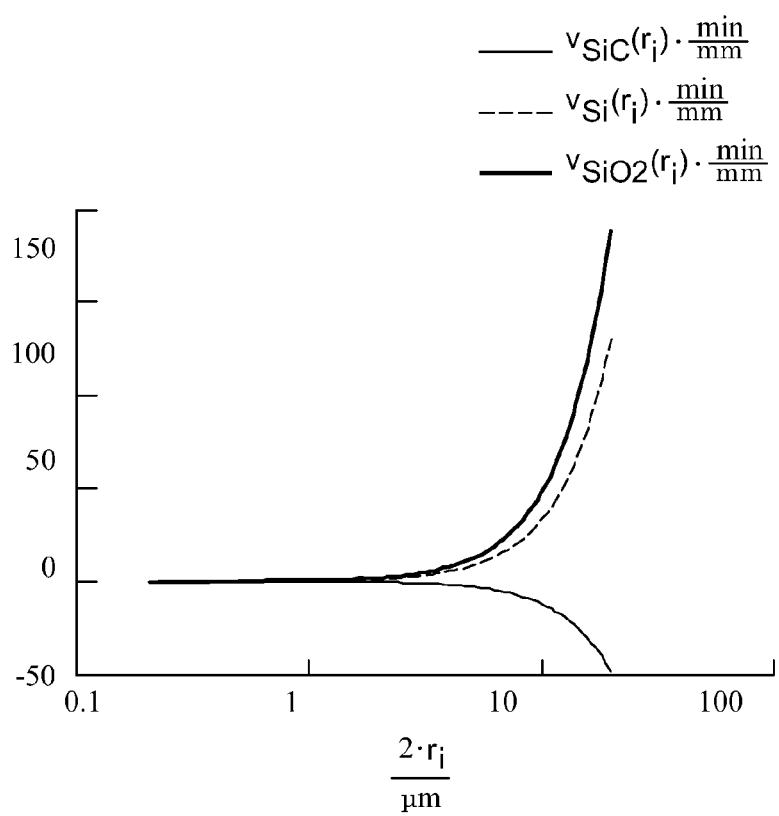
FIG. 12 depicts the terminal separation velocities of silicon carbide, silicon and silicon dioxide versus particle diameter for silicon carbide, silicon and silicon dioxide by gravity and magnetic filter in liquid air where HgradH=$0.037 \cdot 10^{16}$ $A^2/m^3$.

It may also be possible to separate the silicon carbide particles into the lower chamber. Referring now to FIG. 12, it can be seen that silicon carbide will fall through the magnetic filter to the lower chamber when HgradH=$0.037 \cdot 10^{16}$ $A^2/m^3$.

In this embodiment, liquid air, the strength of the magnets that may be needed for a separation is reduced by a factor of 14, which can bring the magnetic field requirements within reach of existing permanent magnet technology. Thus, although reducing the oxygen content of the mixture might require stronger magnets, it could then be possible to gain a wider working range of magnetic field intensity and gradients. As a result, instead of having difficulty arranging a magnetic field with a difficult specification, the liquid air composition can be adjusted for a specific set of magnets. For liquid air, the working range for maximum HgradH is from about $0.034 \cdot 10^{16}$ $A^2/m^3$ to about $0.037 \cdot 10^{16}$ $A^2/m^3$. If the liquid air composition is 10.5% $O_2$ and 89.5% $N_2$, the working range is from about $0.066 \cdot 10^{16}$ $A^2/m^3$ to about $0.074 \cdot 10^{16}$ $A^2/m^3$. The latter composition would have the same magneto-Archimedes effect if the compressed air has an oxygen partial pressure of about 6.9 MPa (1000 psi).

It is to be noted that an HgradH of $0.25 \cdot 10^{16}$ $A^2/m^3$ can be achieved with permanent magnets, allowing separation with oxygen partial pressure of about 1.8 MPa (265 psi).

It is to be further noted that the design of the magnetic field/system detailed herein may be optimized as needed by means generally known in the art, and detailed herein, for a given saw kerf material (e.g., if a different abrasive grain is present), without departing from the scope of the present disclosure. In one embodiment, however, the tubular magnetic filter suitably has an hour-glass cross-section and the non-uniform magnetic field has a magnetic flux density of about 3 Tesla between a first pole and a second pole. Further, the silicon kerf particles in the magnetic field gradient can be separated by pressurized gas, liquids, or cryogenic fluids. More suitably, the silicon kerf particles are suspended in pressurized gas.

4. Additional Applications

It is to be noted that, in addition to the embodiments detailed herein above, the present disclosure provides a means by which to recover the abrasive grains from the saw kerf. Once collected, "spent" abrasive grains may be separated from "unspent" abrasive grains by means generally known in the art (see, e.g., U.S. Pat. No. 7,223,344, the entire contents of which are incorporated herein by reference for all relevant and consistent purposes), the latter being reused in further slurries.

Additionally, the present disclosure provides a means by which to prepare a new silicon raw material, such as solar grade silicon pellets. Specifically, the silicon particles recovered from saw kerf, using the various embodiments disclosed in the present disclosure, may be further processed (e.g., melted and shaped) to form solar grade silicon pellets, using means generally known in the art.

Finally, the present disclosure provides an improved process for slicing or cutting silicon ingots, which involve the addition of a chelating agent to the slurry used in the process. The presence of the chelating agent, such as a chelating agent soluble in an organic lubricating fluid (e.g., P50 in combination with a mineral oil lubricating fluid) enable metal contaminants (such as those introduced from the wire saw) in the saw kerf to be trapped or sequestered. In this way, subsequent steps taken to recover the silicon particles, and/or abrasive grains, and/or the lubricating fluid, form the saw kerf may be simplified.

The following Examples describe various embodiments of the present disclosure. Other embodiments within the scope of the appended claims will be apparent to a skilled artisan considering the specification or practice of the invention as described herein. It is intended that the specification, together with the Examples, be considered exemplary only, with the scope and spirit of the invention being indicated by the claims, which follow the Examples.

EXAMPLES

The following non-limiting examples are provided to further illustrate the present disclosure.

Example 1

Exemplary Si Particle Separation

Approximately 3 grams of silicon were prepared from 190 grams of polyethylene glycol (PEG) suspended saw slurry using SPT as the working heavy liquid. The PEG was removed by repeated washing with water and vacuum filtration. When removed, the material of bulk liquid resembles a hard mud, which could be somewhat re-suspend on mixing with water.

Metals were removed from the mixture by repeated washing with 0.1 normal HCl and vacuum filtration. HCl was used at this step without HF, so that copper may be removed. This is so because in the presence of HF, copper and nickel may tend to plate out on the silicon surface.

The next step involved treating the washed solids with HF:HCl, which re-suspended the particles and generated copious amounts of gas bubbles and formed a floatation froth. A grey slick of silicon was observed on the top surface of the froth, while the liquid underneath the froth was brown and comprised some portion of the silicon carbide.

In this regard it is to be noted that, without being held to a particular theory, it is believed that metal from the wire saw acted to create bonds between the silicon and carbide present in the solid mixture. The treatment of the solid mixture with the acids acts to de-bond the silicon from the silicon carbide. After de-bonding, the material was washed with water and vacuum filtered until the pH of the fluid is approximately 7.

The resulting wet mud-like mixture was then re-suspended in a heavy liquid (in this instance SPT) and centrifuged at approximately 17,000 g for approximate 70 minutes. During centrifugation, the top of the vial became enriched in silicon. In order to prevent the collisions of heavy particles with light particles and forcing silicon downwards, the solids loading in the vial was limited to about 5% by volume.

The collected silicon enriched material was then captured and centrifuged a second time with a clean mechanical separation. The silicon was then collected in a centrifuge-filter and the suspending SPT was largely removed.

In this instance, the SPT was diluted with water to a density of about 2.6 g/cm³ and a viscosity of about 10 cP. This represents the midpoint density between silicon and silicon carbide and was believed to be an ideal density to analytically separate same-sized particles. The size distributions of the particles were then taken and essentially no particles smaller than 100 nm was found to present. Particle size measurements showed that about 99% of the silicon particles were larger than about 500 nm; as such, the optimum density and viscosity of the SPT liquid could be adjusted for separating 100 nm silicon carbide particles from 500 nm silicon particles.

Figure 13:
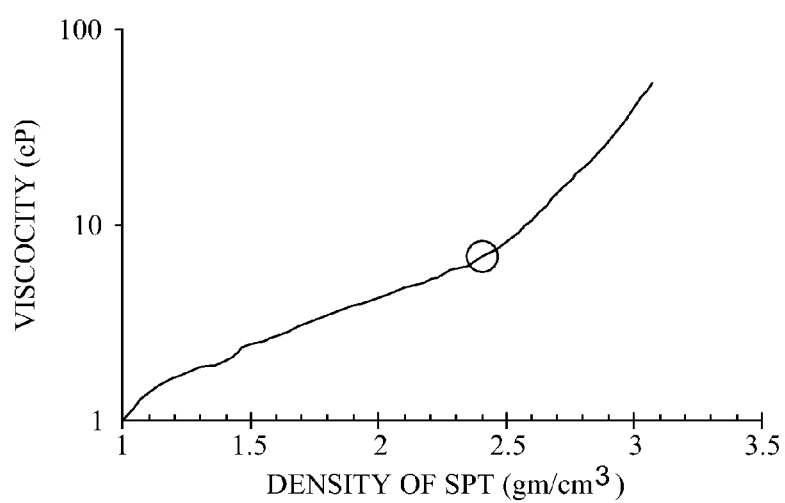
FIG. 13 depicts aqueous sodium metatungstate viscosity versus density.
Figure 14:
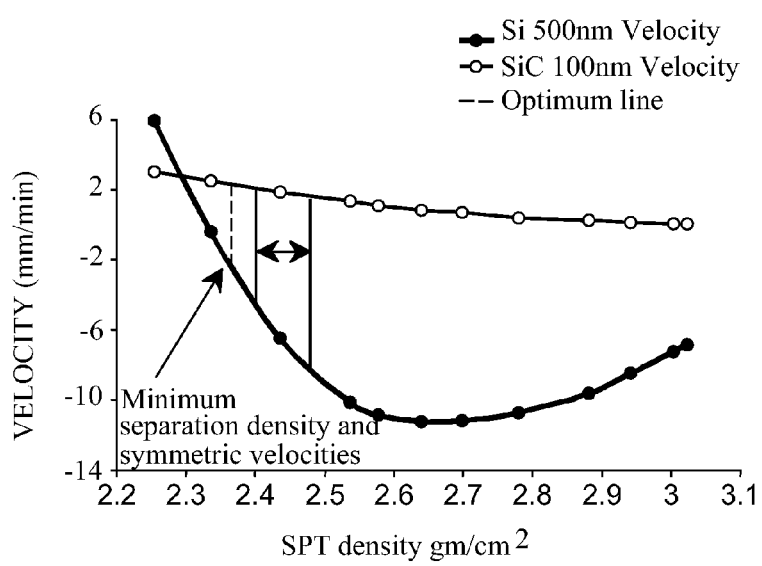
FIG. 14 depicts the centrifugal density separation at 17,000 g in sodium metatungstate liquid.

FIG. 13 illustrates and optimum density for SPT, determined by the differing size cut-offs used for silicon and silicon carbide particles in this experiment, and the minimum density that may be needed for separation (the optimum density is circled). FIG. 14 further discloses a practical range of densities for the SPT and the minimum separation density of SPT compared to the symmetric sedimentation velocities of the silicon and silicon carbide particles.

In another test, polysilicon dust was rinsed with about 0.1 ml to about 0.3 ml of water. The material was then centrifuged five times at about 4,000 g each time, which forces water through the packed solid, and a filter membrane that was present therein. (In this regard it is to be noted that although 5 centrifuge passes were calculated here, fewer centrifuge passes may be used within a purpose-built, automated and optimized system.)

An HCl solution (approximately 0.1 N) was then used to rinse the centrifuged material (about 0.1 ml to about 0.3 ml), and then once again it was centrifuged five times at about 4,000 g each time. The vial was then filled with the HCl solution again, so that all of the silicon dust was covered. The resulting mixture was then aged for 24 hours (to help remove bulk metal contaminants, as further detailed in the following Example).

After aging, the silicon kerf waste material (now polysilicon dust) was rinsed with about 0.1 ml to about 0.3 ml of water and then centrifuged five times at 4,000 g each time once again. The resulting silicon solids were then dried for about 12 hours at about 40° C.

Example 2

Bulk Metal Contamination

As previously noted, some metal contaminants may be out-diffused from silicon particles within a commercially reasonable period of time. By using the following diffusion equation series solution, it is possible to calculate the bulk metal out-diffusion from the particles. The model is a uniformly bulk contaminated sphere, where the copper/nickel is forced to zero on the boundary.

$$u(r,t) = u_0 \frac{2a}{\pi r} \sum_{n=1}^{\infty} \left[ \frac{(-1)^{n+1}}{n} \sin\left(\frac{n\pi r}{a}\right) \exp\left(\frac{-n^2\pi^2 Dt}{a^2}\right) \right] \quad \text{(Equation 2)}$$

Where u is the transient and $u_o$ is the initial concentration of contaminant, D is the diffusion coefficient, a is the particle radius, r is the radius of the particle in question, n is an integer in the summation series and t is time. The function u(r,t) is well-behaved, and the total amount of material in the spherical particle at any time can be determined by a term-by-term integral on r.

$$I(t) = \int_0^a u(r,t) 4\pi r^2 dr \quad \text{(Equation 3)}$$

Equation 3 represents an integration with respect to the radius of the metal content of the sphere at any given time, t. Thus, if Equation 2 were plugged into Equation 3 for u (r,t), the normal procedures of calculus lead to Equation 4:

$$I(t) = u_0 \frac{8a^3}{\pi^2} \sum_{n=1}^{\infty} \left[ \frac{(-1)^n}{n^3}(-\sin(n\pi) + n\pi\cos(n\pi))\exp\left(\frac{-n^2\pi^2 Dt}{a^2}\right) \right] \quad \text{(Equation 4)}$$

Figure 15A:
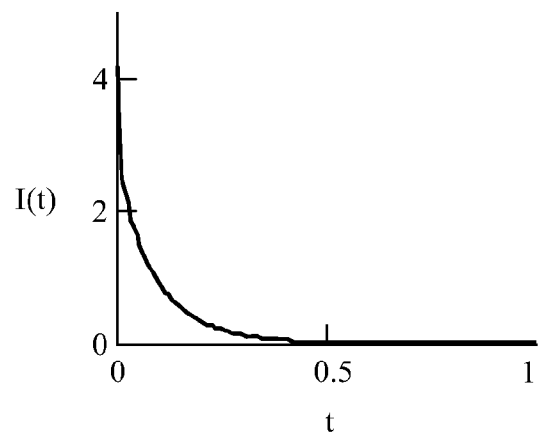
FIG. 15A depicts the time dependant bulk metal out-diffusion from a sphere for initial concentration u=1, initial total content in reduced units is 4/3Π when a=1 and D=1.
Figure 15B:
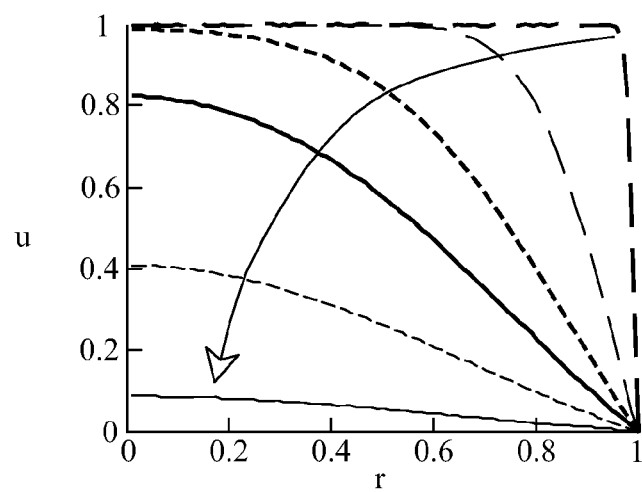
FIG. 15B depicts radial concentration profiles at reduced times 0.0001, 0.01, 0.04, 0.08, 0.16, and 0.32.

In these equations, when a=1 and D=1, the time dependant out-diffusion of material yields the results disclosed in FIGS. 15A and 15B.

In the first sample that was separated, the bulk content of copper was 47 ppma and the bulk content of nickel was 0.21 ppma. It can be noted that if the tests were run on Czochralski silicon ingots, as opposed to solar grade ingots, the bulk copper may be reduced by a factor of about 47,000 and the bulk nickel may be reduced by a factor of about 105.

For copper in 10 ohm-cm silicon at 20° C., the diffusion coefficient is 364 μm²/min. For P(++) silicon the copper diffusion coefficient is 0.371 μm²/min. In P(−) silicon at 20° C., the nickel diffusion coefficient is 0.427 μm²/min. The following Table 3 discloses the calculations of out-diffusion time of bulk metals for a 7-micron, oxide terminated silicon particle, at 20° C.

TABLE 3

Calculated out-diffusion time of bulk metals for a 7-micron, oxide terminated silicon particle, at 20° C.

| Material | metal | Initial bulk contamination (ppma) | Final bulk contamination (ppma) | time to final (minutes) |
|---|---|---|---|---|
| Si 10 ohm cm | Cu | 47 | 0.001 | 0.14 |
| Si 10 ohm cm | Ni | 0.21 | 0.002 | 0.48 |
| Si about 0.005 ohm cm | Cu | 47 | 0.001 | 137 |

It can be noted that by waiting a few hours at room temperature, bulk nickel and bulk copper will plate out onto the surface of an oxide coated particle.

Example 3

Froth Flotation

A procedure for initial separation and enrichment of silicon particles using froth flotation was performed by hand to substantially lower the mass-load needed for a centrifugal based separation system. In this Example, 47.0818 grams of saw kerf particles were treated to produce silicon enriched froth (the saw kerf being from a different batch than those analyzed and shown in Table 1). A vacuum filter of 250 ml liquid capacity was used with a 0.45 micron PVDF filter for rising and de-watering.

The following sequence of steps were used here:
(1) the waste was rinsed with 250 ml $H_2O$ twice;
(2) rinsed with 1,000 ml solution of 1:9 36% HCl:$H_2O$;
(3) drained to a sludge and recovery manually to a PTFE beaker;
(4) to the resulting sludge added a frothing solution: $H_2O$: 49% HF:36% HCl 250 ml:80 ml:25 ml;
(5) the froth was generated and skimmed away to another beaker over a period of 7 hours;
(6) the captured froth was rinsed in vacuum filter using 1,800 ml:200 ml $H_2O$:36% HCl;
(7) captured froth rinsed in the vacuum filter with 1,000 ml $H_2O$;
(8) the recovered paste was dried and weighed;
(9) the paste was etched to remove silicon using 4:3:1 $H_2O$:49% HF:70% $HNO_3$ until gas generation stopped; and,
(10) the surviving material was dried and weighed.

The recovered dried froth contained 0.3085 grams silicon carbide and 0.3295 grams silicon. The recovered silicon was expected to be about 0.011*47.0818 (see Table 1) or about 0.52 grams. As the froth in this sample contains more than expected silicon, the gross separation of silicon from silicon carbide was achieved with 0.3295/0.52*100 equals about 63% efficiency, and an enrichment factor on the order of (0.3295/(0.3295+0.3085))/0.02 equals about 26.

Example 4

SEM Imagery

For SEM imagery and size distributions, samples of silicon particles were collected on a 0.45 micron polyvinylidene difluoride (PVDF) membrane filter and were then acid washed. The resulting particles were irregular in shape and gave the appearance of material that was cut by brittle fracture (See FIGS. 16A and 16B).

Figure 16A:
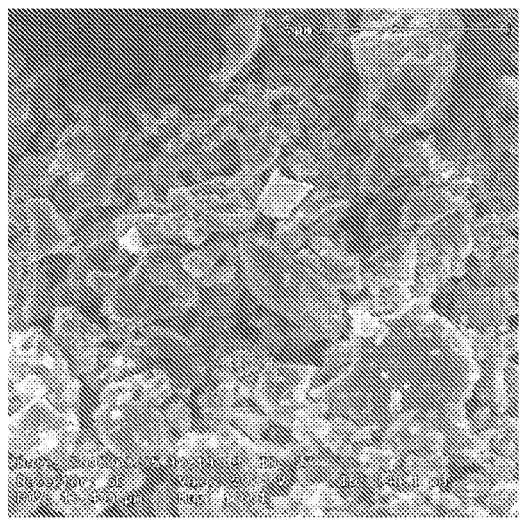
FIGS. 16A and 16B depict images of silicon kerf particles separated from saw kerf.
Figure 16B:
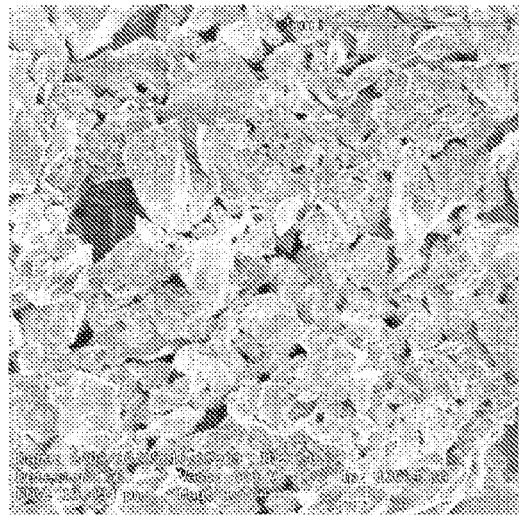
Figure 17A:
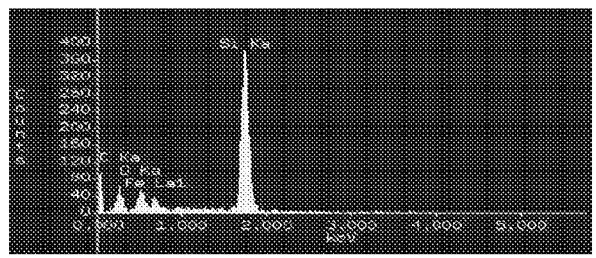
FIGS. 17A-17D depict EDX spectra of four different silicon particles.
Figure 17B:
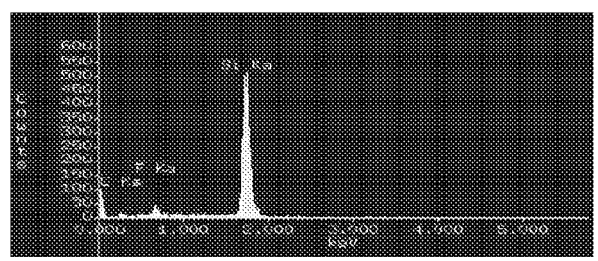
Figure 17C:
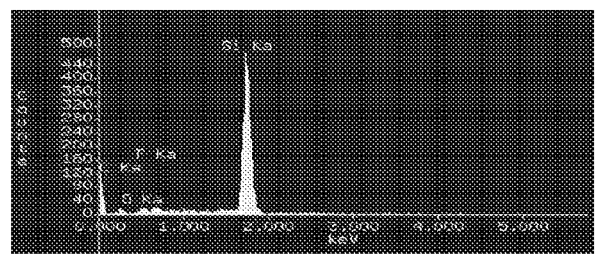
Figure 17D:
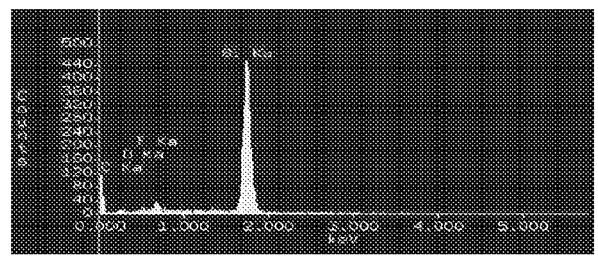
Figure 18A:
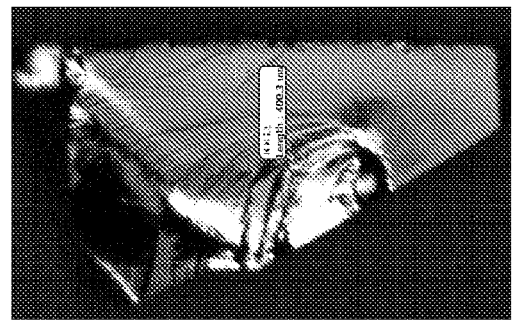
FIG. 18A is a 400 micron Nomarksii microscope image of flakes broken off of a silicon pellet.
Figure 18B:
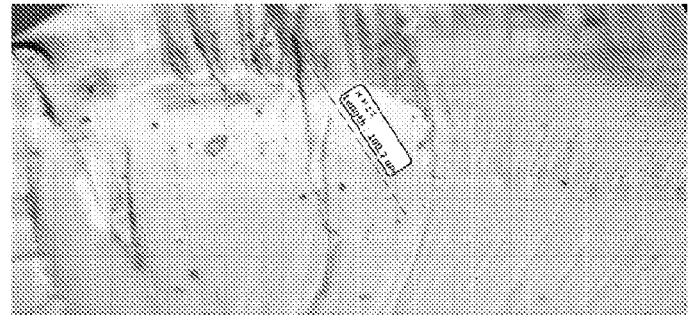
FIGS. 18B and 18C depict 100 micron Nomarksii microscope images of flakes broken off a silicon pellet, showing interior and exterior surfaces.
Figure 18C:
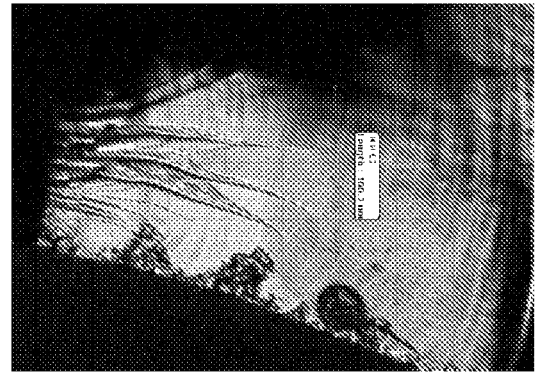
Figure 18D:
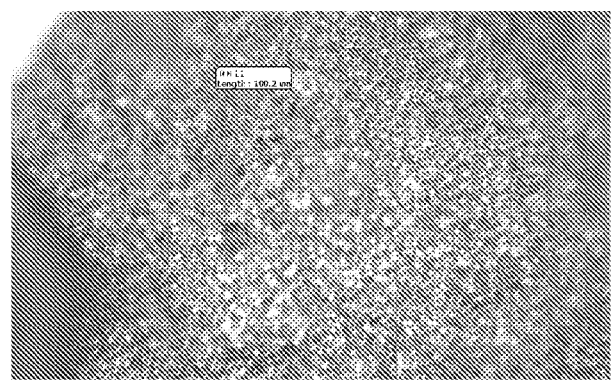
FIG. 18D is a 3 to 10 micron Nomarksii microscope image of flakes broken off of a silicon pellet.

FIGS. 16A and 16B display images of silicon kerf particles separated from the saw kerf mixture. A total of 125 silicon particles were measured for cross-sectional area. The images were analyzed by tracing over the individually distinguishable particles computing the cross-sectional area, and the equivalent sphere diameter of the same cross-sectional area. The resulting size distribution compares to the data collected in Examples 1 and 2 by a PSS780 Accusizer particle size analyzer.

Example 5

Bulk Metal Digestion (First Attempt)

When using SEM analysis, material captured on the PVDF membrane filter was found to be free of tungsten. Due to the possible presence of fluorine, however, any iron signal that might be present could be masked. As a result, EDX spectra of four different silicon particles were taken to determine the amount of bulk metal contamination, if any, within the silicon particles.

FIGS. 17A-17D depict the results of the EDX spectra for the four different silicon particles examined. The iron and fluorine signals were found to be difficult to differentiate. The fluorine and carbon signals in FIGS. 17A-17D come from the PVDF filter used to capture the silicon particles.

Initial analysis of the results showed particles that were not completely free of metals. Further testing revealed, however, that the purity of the silicon kerf particles can be improved by increased leaching and rinsing. Table 4 displays the bulk metal digestion data on a 14 mg silicon particle from the first separation attempt. Because of the volatility of boron and phosphorous in the technique used, the boron and phosphorous measurements may not be relevant.

TABLE 4

Bulk metal digestion data on 14 mg silicon

| Element | ppma | Element | ppma | Element | ppma | Element | ppma |
|---|---|---|---|---|---|---|---|
| B | 11.5 | K | 9.4 | Fe | 1.4 | Sr | 0.035 |
| Na | 3.8 | Ti | 2.1 | Ni | 0.21 | Mo | 0.023 |
| Mg | 7.8 | V | 1.0 | Co | 0.0027 | Ba | 0.010 |
| Al | 2.0 | Cr | 0.087 | Cu | 46.7 | Ta | 0.00044 |
| P | 3.0 | Mn | 0.037 | Zn | 0.16 | W | 16.3 |

Example 6

Polysilicon Pellets

In order to prepare polysilicon pellets, purified silicon was separated from the kerf particles and dropped into a silica crucible and melted down into a pellet. The dried polysilicon dust was able to bind together to form a weak pellet. After drying, however, due to shrinkage the polysilicon dust is bound weakly to the polypropylene wall of the centrifuge filter. The centrifuge filter vials have a 100 nm PVDF filter membrane and an outer vial diameter of 8 mm.

The pellet was then cooled from the melt at a rate of no slower than about 5.7K/min, and then released from the crucible by etching off the silica with 49% HF and 36% HCl at a ratio of 1,000:25 to prevent the deposition of copper. The resulting surface was rough with texture about 3 microns long. The interior of the surface is homogeneous under optical microscopy.

About 20 mg of flakes that broke from the pellet (while being removed from the crucible) were exposed to a 1:1 mixture of 49% HF and 70% $HNO_3$. The silicon dissolved completely and no residue was observed. Such a result is an indication that silicon carbide contamination may not have been present in gross quantities.

After the pellet was removed from the crucible, the etching was quenched with a 1,000:25 solution of de-ionized water and 36% HCl, and then soaked in 1,000:25 solutions of 30% $H_2O_2$ and 36% HCl in order to grow a clean protective oxide on the surface.

The resulting polycrystal was full of voids and had a columnar-type internal structure. There was enough internal mechanical stress in the polycrstyal that when handled it broke. FIGS. 18A-18D depict Nomarksii microscope images of flakes broken off of a silicon pellet, showing exterior and interior surfaces.

Example 7

Bulk Metal Digestion (Second Attempt)

In this Example, 164 mg of the polycrystal were digested in $HF:HNO_3$. The bulk metal content was improved from the first attempt as a result of additional acid washing of the recovered silicon powder (compare Table 4 and Table 5).

TABLE 5

Bulk metal digestion data on 14 mg silicon from second separation attempt, after melting

| element | ppma | element | ppma | element | ppma | element | ppma |
|---|---|---|---|---|---|---|---|
| B | 3.730 | K | 0.001 | Fe | 0.357 | Sr | 0.000 |
| Na | 0.001 | Ti | 0.459 | Ni | 0.039 | Mo | 0.013 |
| Mg | 0.036 | V | 0.094 | Co | 0.001 | Ba | 0.000 |
| Al | 0.128 | Cr | 0.051 | Cu | 2.638 | Ta | 0.000 |
| P | 0.507 | Mn | 0.006 | Zn | 0.001 | W | 8.279 |

Metal segregation effects from melting may not be significant as the location of the polysilicon used for acid digestion was not selective. The digestion fluid was centrifuged at 21,000 g for 2 hours and the results are detailed in Table 5. The dry content produced was green silicon carbide, measured at 8.41 mg (a weight fraction of 0.0513). The starting weight fraction of silicon carbide is 0.979, before the two centrifuge passes performed. Each centrifuge pass can be taken as a filter, and a fraction $C_f$ carbide survives on each pass. The determination of the purification coefficient $C_f$ per centrifuge pass can be found through algebraic equations.

Prior to purification, the total weight of solids is $W^0$, the weight of the silicon is $W_{Si}^0$, and the carbide is $W_{SiC}^0$. The ratio of solids to each from this sample based on previously disclosed calculations is $W_{Si}^0/W_{SiC}^0=0.0216$. The mole fraction of carbon, and mole fraction of silicon carbide $fa^0$, are the same. Prior to purification, therefore, the following conditions are present:

$$W^0 = W_{Si}^0 + W_{SiC}^0 \quad \text{(Equation 5)}$$

$$fa^0 = \frac{\frac{W_{SiC}^0}{MW_{SiC}}}{\frac{W_{Si}^0}{MW_{Si}} + \frac{W_{SiC}^0}{MW_{SiC}}}$$

It should be noted that the superscripts in this notation represent indices, not powers.

After each centrifuge step, approximately all of the silicon is retained, but only a small fraction $C_f$ of carbide remains. After n centrifuge steps the following relationship is present:

$$W^n = W_{Si}^0 + (C_f)^n W_{SiC}^0 = W_{SiC}^0 + W_{SiC}^n \quad \text{(Equation 6)}$$

$$fa^n = \frac{\frac{W_{SiC}^n}{MW_{SiC}}}{\frac{W_{Si}^0}{MW_{Si}} + \frac{W_{SiC}^n}{MW_{SiC}}} = \frac{\frac{(C_f)^n W_{SiC}^0}{MW_{SiC}}}{\frac{W_{Si}^0}{MW_{Si}} + \frac{(C_f)^n W_{SiC}^0}{MW_{SiC}}}$$

where $W^n$ is the total mass after n centrifuge passes, n in the expression $(C_f)^n$ is a power and not an index, and $fa^n$ is the mole fraction of carbide in the mixture.

After two centrifuge passes, 0.163 g of silicon and 0.00841 g of carbide remained and were taken for analysis. Thus, the starting amount of solids was 0.163/0.0216=7.593 grams of solids. Based on starting material proportions, 7.593*0.0216=0.663 grams of silicon, and (1−0.0216)*7.593=7.429 grams of carbide.

Thus, it follows that:

$$C_f = \left(\frac{W_{SiC}^n}{W_{SiC}^0}\right)^{1/n}, \text{ or } \left(\frac{0.00841}{7.429}\right)^{1/2} = 0.0336. \quad \text{(Equation 7)}$$

It remains possible, however, to use the relationships previously developed to determine the number of centrifuge passes needed to reduce the carbon content to SEMI standard levels for polysilicon. SEMI standard M6-1000 states required carbon content as <=10 ppma for single crystal solar cells, and <=20 ppma for polycrystalline cells. Using the sample of saw kerf used in experimentation, the following relationship exists for calculating the number of n centrifuge passes that may be needed to remove carbon (as carbide) below specification limits.

$$\text{ppma Carbon} = 10^6 \; fd^n = 10 = \frac{\frac{(C_f)^n(1-0.0216)}{MW_{SiC}}}{\frac{0.0216}{MW_{Si}} + \frac{(C_f)^n(1-0.0216)}{MW_{SiC}}} 10^6 \qquad \text{(Equation 8)}$$

It takes n=4.41 to arrive at the SEMI spec level (10 ppma) for single crystal cells. As such, at least 5 centrifuge passes may be needed to get carbide down to acceptable levels.

SPT liquid was used for this proof of concept. SPT has the advantage of low toxicity, and liquidity at room temperature. Gross metallic contamination is a problem, however, particularly with tungsten. The salt-hydrate $KF.2H_2O$ has the right density for the present disclosure, a further advantage of attacking particles bonded with $SiO_2$, and a lower cost. Despite the thermal requirements, $KF.2H_2O$ is suitably the preferred fluid for centrifugal separations. High temperature may be needed, however, to get useable viscosity.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

What is claimed is:

1. A method for separating and recovering silicon particles from silicon saw kerf resulting from slicing silicon wafers from a silicon ingot, the saw kerf comprising an organic lubricating fluid and a mixture of solid particulate comprising abrasive grains, silicon particles, metal particles and oxide particles, the method comprising:
   contacting the saw kerf with a chelating agent soluble in the organic lubricating fluid to form a complex with one or more metals present in the saw kerf;
   mixing the chelated saw kerf solution with an aqueous acid solution and allowing the mixture to separate into an aqueous phase and an organic phase, the aqueous phase comprising silicon particles and the organic phase comprising the complex formed between chelating agent and the metals;
   collecting the aqueous phase comprising the silicon particles; and,
   recovering at least a portion of the silicon particles from the aqueous phase, wherein the recovered silicon particles have a carbon content of less than about 50 ppma and have a content of metal contaminants of less than about 150 ppma.

2. The method of claim 1 wherein the aqueous phase comprises the silicon particles and abrasive grains, and further wherein the aqueous phase is subjected to a density-dependent separation technique to separate the silicon particles from the abrasive grains.

3. The method of claim 2 wherein the density-dependent separation technique is selected from sedimentation centrifugation, filtration centrifugation, and hydro-cyclone separation.

4. A method for separating and recovering silicon particles from silicon saw kerf resulting from slicing silicon wafers from a silicon ingot, the saw kerf comprising an organic lubricating fluid and a mixture of solid particulate comprising abrasive grains, silicon particles, metal particles and oxide particles, the method comprising:
   contacting the saw kerf with a chelating agent soluble in the organic lubricating fluid to form a complex with one or more metals present in the saw kerf;
   mixing the chelated saw kerf solution with an aqueous acid solution and allowing the mixture to separate into an aqueous phase and an organic phase, the aqueous phase comprising silicon particles and abrasive particles and the organic phase comprising the complex formed between chelating agent and the metals;
   collecting the aqueous phase comprising the silicon particles and the abrasive particles;
   contacting the aqueous phase comprising the silicon particles and the abrasive particles with a source of iodine, in order to convert at least a portion of the silicon present therein to $SiI_4$; and
   recovering at least a portion of the silicon particles and $SiI_4$ from the aqueous phase by subjecting the aqueous phase to a density-dependent separation technique to thereby separate the silicon particles from the abrasive grains, wherein the density-dependent separation technique is selected from sedimentation centrifugation, filtration centrifugation, and hydro-cyclone separation and the recovered silicon particles have a carbon content of less than about 50 ppma and have a content of metal contaminants of less than about 150 ppma.

5. The method of claim 4 wherein, prior to the density-dependent separation, the silicon particles are contacted with a liquid having a density between about 2.25 and about 3.35 $gm/cm^3$ to aid in the separation of silicon and abrasive grains present therein.

6. The method of claim 5, wherein the silicon particles are contacted with an aqueous heteropolytungstate solution.

7. The method of claim 2, wherein the collected aqueous phase is dried prior to separating the silicon particles from the abrasive grains therein.

8. A method for separating and recovering silicon particles from silicon saw kerf resulting from slicing silicon wafers from a silicon ingot, the saw kerf comprising an organic lubricating fluid and a mixture of solid particulate comprising abrasive grains, silicon particles, metal particles and oxide particles, the method comprising:
   contacting the saw kerf with a chelating agent soluble in the organic lubricating fluid to form a complex with one or more metals present in the saw kerf;
   mixing the chelated saw kerf solution with an aqueous acid solution and allowing the mixture to separate into an aqueous phase and an organic phase, the aqueous phase comprising silicon particles and abrasive grains and the organic phase comprising the complex formed between chelating agent and the metals;

collecting the aqueous phase comprising the silicon particles and the abrasive grains;

drying the aqueous phase to thereby yield a dried mixture comprising the silicon particles and the abrasive grains, and, recovering at least a portion of the silicon particles from the dried mixture by subjecting the dried mixture to a non-uniform magnetic field, wherein the recovered silicon particles have a carbon content of less than about 50 ppma and have a content of metal contaminants of less than about 150 ppma.

9. The method of claim 8, wherein the method further comprising:

creating a non-uniform magnetic field between a first pole and a second pole of the magnet;

aerosolizing the dried, solid particulate mixture; and, feeding the aerosol into the non-uniform magnetic field to separate silicon particles from abrasive grains present therein.

10. The method of claim 1, wherein the chelating agent is an aldoxime.

11. The method of claim 4, wherein the chelating agent is an aldoxime.

12. The method of claim 7, wherein the chelating agent is an aldoxime.

* * * * *